United States Patent
Misra et al.

(10) Patent No.: US 11,677,974 B2
(45) Date of Patent: Jun. 13, 2023

(54) SYSTEMS AND METHODS FOR DERIVING A MOTION VECTOR PREDICTION IN VIDEO CODING

(71) Applicants: Sharp Kabushiki Kaisha, Sakai (JP); FG Innovation Company Limited, New Territories (HK)

(72) Inventors: Kiran Mukesh Misra, Vancouver, WA (US); Frank Bossen, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/745,020

(22) Filed: May 16, 2022

(65) Prior Publication Data
US 2022/0286704 A1    Sep. 8, 2022

Related U.S. Application Data

(63) Continuation of application No. 17/293,158, filed as application No. PCT/JP2019/044730 on Nov. 14, 2019, now Pat. No. 11,375,230.

(60) Provisional application No. 62/815,109, filed on Mar. 7, 2019, provisional application No. 62/793,311, filed on Jan. 16, 2019, provisional application No. 62/793,080, filed on Jan. 16, 2019, provisional application No. 62/792,872, filed on Jan. 15, 2019, provisional application No. 62/787,695, filed on Jan. 2, 2019, provisional application No. 62/768,772, filed on Nov. 16, 2018.

(51) Int. Cl.
    H04N 19/52    (2014.01)
    H04N 19/176   (2014.01)

(52) U.S. Cl.
    CPC .......... *H04N 19/52* (2014.11); *H04N 19/176* (2014.11)

(58) Field of Classification Search
    None
    See application file for complete search history.

(56) References Cited

U.S. PATENT DOCUMENTS

2022/0070489 A1*  3/2022  Zhang ................. H04N 19/176
2022/0150529 A1*  5/2022  Lim ...................... H04N 19/85

OTHER PUBLICATIONS

Misra et al., "Systems and Methods for Deriving a Motion Vector Prediction in Video Coding", U.S. Appl. No. 17/293,158, filed May 12, 2021.

* cited by examiner

*Primary Examiner* — Lindsay J Uhl
(74) *Attorney, Agent, or Firm* — Keating & Bennett, LLP

(57) ABSTRACT

A method of performing motion vector prediction for coding video data is disclosed. A full precision motion vector mv is determined for generating a prediction for video block in a first picture. A rounded motion vector rmv having a less precision than the full precision motion vector mv is stored. A motion vector predictor candidate is generated for a video block in a second picture from the stored motion vector.

3 Claims, 7 Drawing Sheets

SYSTEMS AND METHODS FOR DERIVING A MOTION VECTOR PREDICTION IN VIDEO CODING

TECHNICAL FIELD

This disclosure relates to video coding and more particularly to techniques for deriving a motion vector prediction.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the 10th Meeting of ISO/IEC JTC1/SC29/WG11 16-20 Apr. 2018, San Diego, Calif. As a result of the multiple descriptions of video coding, a draft text of a video coding specification is described in "Versatile Video Coding (Draft 1)," 10th Meeting of ISO/IEC JTC1/SC29/WG11 16-20 April 2018, San Diego, Calif., document JVET-J1001-v2, which is incorporated by reference herein, and referred to as JVET-J1001. "Versatile Video Coding (Draft 2)," 11th Meeting of ISO/IEC JTC1/SC29/WG11 10-18 Jul. 2018, Ljubljana, SI, document JVET-K1001-v7, which is incorporated by reference herein, and referred to as JVETK1001, is an update to JVET-J1001. Further, "Versatile Video Coding (Draft 3)," 12th Meeting of ISO/IEC JTC1/SC29/WG11 3-12 Oct. 2018, Macao, CN, document JVET-L1001-v2, which is incorporated by reference herein, and referred to as JVET-L1001, is an update to JVET-K1001.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (e.g., groups of frames within a video sequence, a frame within a group of frames, regions within a frame, video blocks within a region, and sub-blocks within a video block). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In one example, a method of performing motion vector prediction for coding video data, the method comprising: determining a full precision motion vector my for generating a prediction for video block in a first picture; storing a rounded motion vector rmv having a less precision than the full precision motion vector my; and generating a motion vector predictor candidate for a video block in a second picture from the stored motion vector.

DESCRIPTION OF EMBODIMENTS

Figure 1:
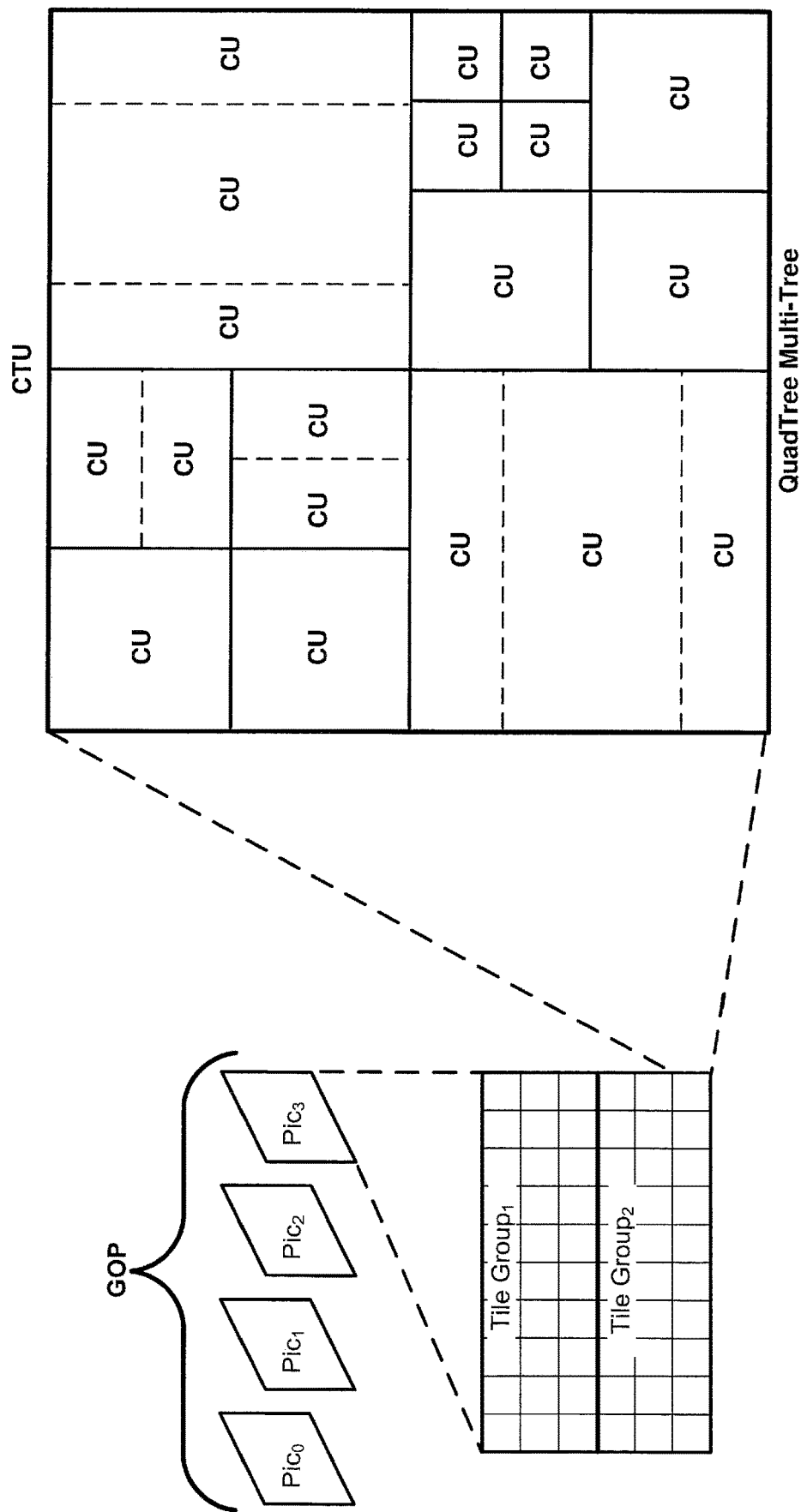
FIG. 1 is a conceptual diagram illustrating an example of a group of pictures coded according to a quad tree multi tree partitioning in accordance with one or more techniques of this disclosure.

In general, this disclosure describes various techniques for coding video data. In particular, this disclosure describes techniques for motion vector prediction in video coding. In particular, this disclosure describes techniques for varying the precision at which motion information used for generating a motion vector prediction is stored. Varying the precision of motion information according to the techniques described herein may be particularly useful for optimizing video coding performance and the memory costs of motion vector prediction. It should be noted that although techniques of this disclosure are described with respect to ITU-T H.264, ITU-T H.265, JVET-J1001, JVET-K1001, and JVET-L1001 the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264, ITU-T H.265, JVET-J1001, JVET-K1001, and JVET-L1001 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for reconstructing video data comprises one or more processors configured to determine a full precision motion vector for generating a prediction for video block in a first picture, store the motion vector at less than the full precision, and generate a motion vector predictor candidate for a video block in a second picture from the stored motion vector.

In one example, a non-transitory computer-readable storage medium comprises instructions stored thereon that, when executed, cause one or more processors of a device to determine a full precision motion vector for generating a prediction for video block in a first picture, store the motion vector at less than the full precision, and generate a motion vector predictor candidate for a video block in a second picture from the stored motion vector.

In one example, an apparatus comprises means for determining a full precision motion vector for generating a prediction for video block in a first picture, means for storing the motion vector at less than the full precision, and means for generating a motion vector predictor candidate for a video block in a second picture from the stored motion vector.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region (e.g., a region must be an integer number of video blocks arranged in a rectangle). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a video block formatted according to the 4:2:0 format, the width and height of an array of samples for the luma component are twice that of each array of samples for the chroma components. For a video block formatted according to the 4:2:2 format, the width of an array of samples for the luma component is twice that of the width of an array of samples for each chroma component, but the height of the array of samples for the luma component is equal to the height of an array of samples for each chroma component. Further, for a video block formatted according to the 4:4:4 format, an array of samples for the luma component has the same width and height as an array of samples for each chroma component.

Video blocks may be ordered within a picture and/or a region according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (also referred to as an largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any) within the same access unit. A slice segment, like a slice, is a sequence of CTUs. Thus, in some cases, the terms slice and slice segment may be used interchangeably to indicate a sequence of CTUs. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice. With respect to JVET-L1001, it has been proposed that slices shall be required to consist of an integer number of complete tiles instead of only being required to consist of an integer number of complete CTUs. As such, a slice including a set of CTUs which do not form a rectangular region of a picture may or may not be supported in some video coding techniques. Further, a slice that is required to consist of an integer number of complete tiles is referred to as a tile group. The techniques described herein may applicable to slices, tiles, and/or tile groups. FIG. 1 is a conceptual diagram illustrating an example of a group of pictures including tile groups. In the example illustrated in FIG. 1, $Pic_4$ is illustrated as including two tile groups (i.e., Tile $Group_1$ and Tile $Group_2$). It should be noted that in some cases, Tile $Group_1$ and Tile $Group_2$ may be classified as slices and/or tiles.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-L1001, CTUs are partitioned according a quadtree plus multi-type tree (QTMT) structure. The QTMT in JVETL1001 is similar to the QTBT in JEM. However, in JVET-L1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, intra prediction data or inter prediction data is used to produce reference sample values for a current video block. The difference between sample values included in a prediction generated from the reference sample values and the current video block may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-L1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients. Quantization essentially scales transform coefficients in order to vary the amount of data required to represent a group of transform coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

Figure 2A:
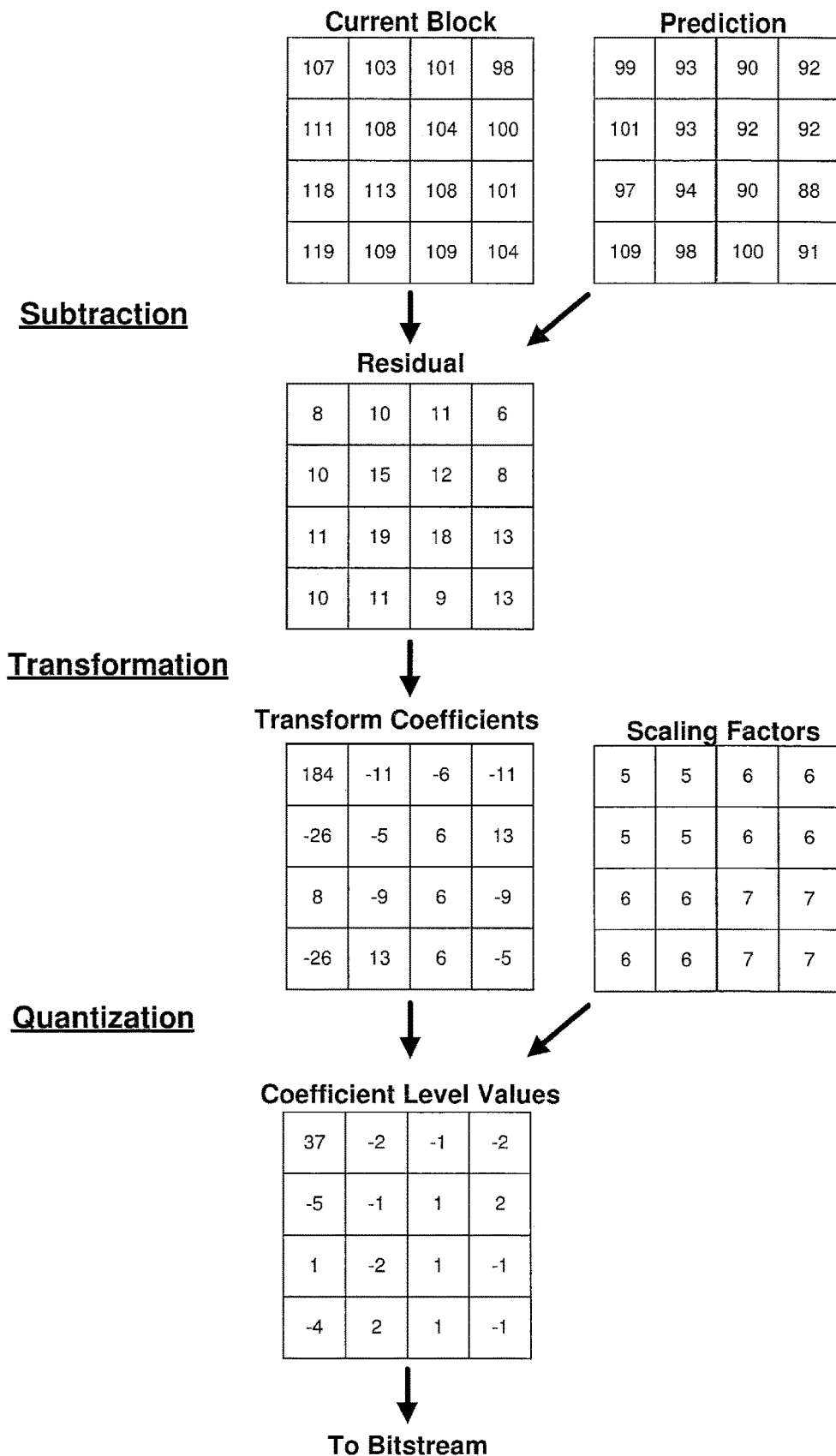
FIG. 2A is a conceptual diagram illustrating example of coding a block of video data in accordance with one or more techniques of this disclosure.
Figure 2B:
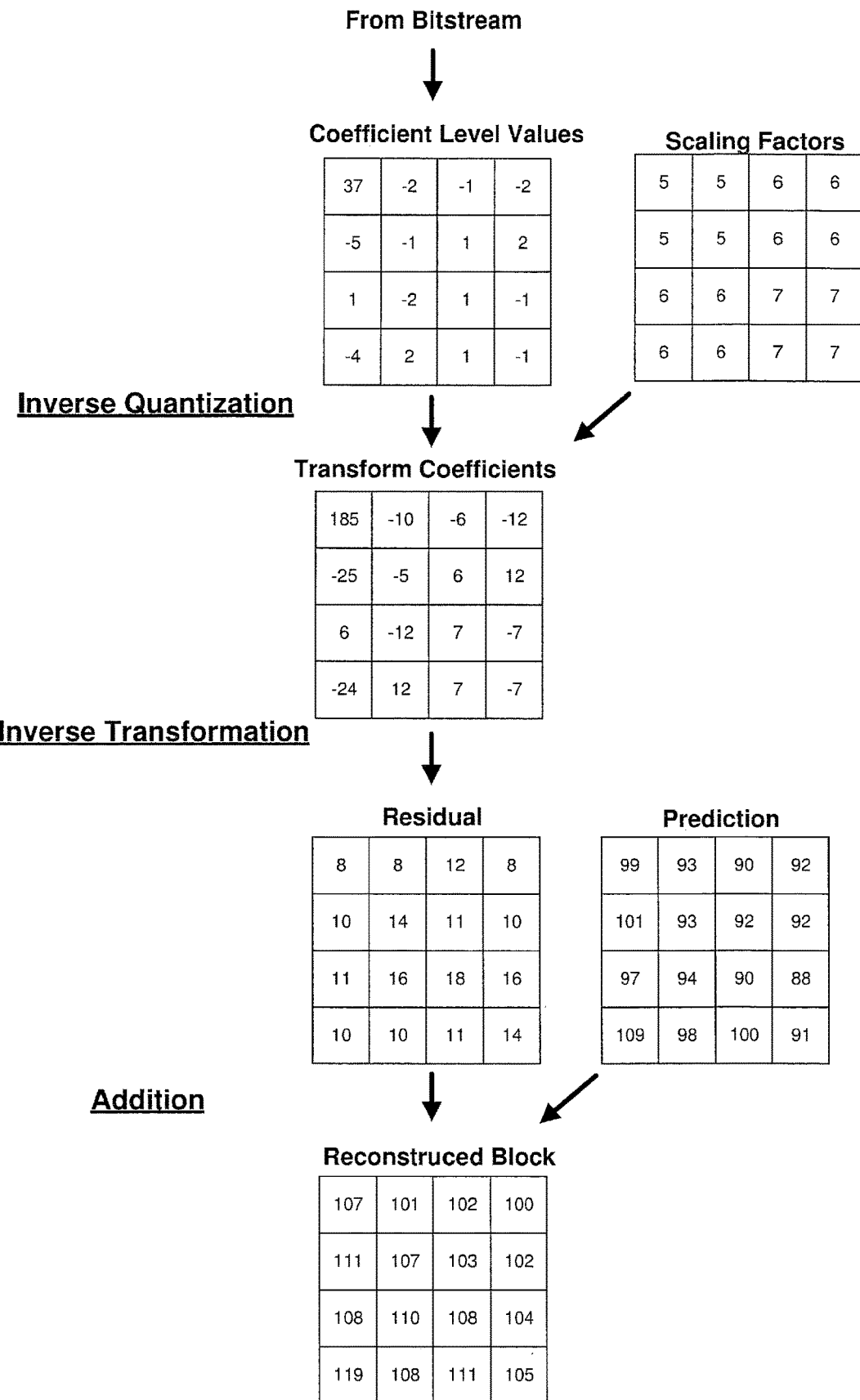
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy.

However, the difference in sample values may be considered acceptable or imperceptible to a viewer of the reconstructed video. Further, as illustrated in FIGS. 2A-2B, scaling is performed using an array of scaling factors.

As illustrated in FIG. 2A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265.

An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data indicate how a prediction is generating for a current video block. For intra prediction coding, an intra prediction mode may specify the location of reference samples within a picture used for generating a prediction. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JVET-L1001, defined possible intra-prediction modes for luma include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. Further, there may be various ways in which intra prediction modes for the chroma components may be derived based on the intra prediction mode for the luma component. It should be noted that the techniques described herein may be generally applicable regardless of the number of defined possible prediction modes.

For inter prediction coding, one or more previously decoded pictures, i.e., a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. In ITU-T H.265, for a P slice, there is a single reference picture list, RefPicList0 and for a B slice, there is a second independent reference picture list, RefPicList1, in addition to RefPicList0. It should be noted that for uni-prediction in a B slice, one of RefPicList0 or RefPicList1 may be used to generate a prediction. Further, it should be noted that in ITU-T H.265, during the decoding process, at the onset of decoding a picture, reference picture list(s) are generated from previously decoded picture stored in a decoded picture buffer (DPB).

Further, a coding standard may support various modes of motion vector prediction. Motion vector prediction enables the value of a motion vector to be derived based on another motion vector. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). ITU-T H.265 supports two modes for motion vector prediction: a merge mode and so-called Advanced Motion Vector Prediction (AMVP). In ITU-T H.265, for both the merge mode and the AMVP for a current PB, a set of candidate blocks is derived. Both a video encoder and video decoder perform the same process to derive a set of candidates. Thus, for a current video block, the same set of candidates is generated during encoding and decoding. A candidate block includes a video block having associated motion information from which motion information used to generate a prediction for a current video block can be derived. For the merge mode in ITU-T H.265, all motion information (i.e., motion vector displacement values, reference picture indices, and reference picture lists) associated with a selected candidate is inherited as the motion information for the current PB. That is, at a video encoder, a candidate block is selected from the derived set of candidates and an index value included in the bitstream indicates the selected candidate and thus, indicates the motion information for the current PB. For AMVP in ITU-T H.265, the motion vector information for the selected candidate is used as a motion vector predictor (MVP) for the motion vector of the current PB. That is, at a video encoder, a candidate block is selected from the derived set of candidates and an index value indicating the selected candidate and a delta value (i.e., a motion vector delta (MVD)) indicating the difference between the motion vector predictor and the motion vector for the current PB are included in the bitstream. Further, for AMVP in ITU-T H.265, syntax elements identifying a reference picture are included in the bitstream.

In ITU-T H.265, a set of candidate blocks may be derived from spatial neighboring blocks, and temporal blocks. Further, generated (or default) motion information may be used for motion vector prediction. In ITU-T H.265, whether motion information used for motion vector prediction of a current PB includes motion information associated with spatial neighboring blocks, motion information associated with temporal blocks, or generated motion information is dependent on the number of candidates to be included in a set, whether temporal motion vector prediction is enabled, the availability of blocks, and/or whether motion information associated with blocks is redundant.

Figure 3:
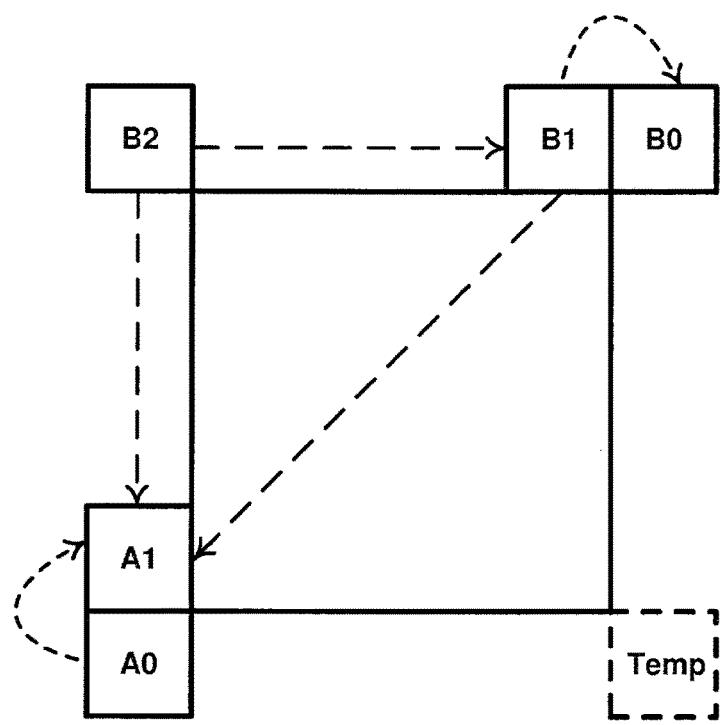
FIG. 3 is a conceptual diagram illustrating the position of neighboring video blocks for inclusion in a set of candidate for motion vector predictors in accordance with one or more techniques of this disclosure.

For the merge mode in ITU-T H.265, a maximum number of candidates that may be included in a set of candidate blocks may be set and signaled by a video encoder and may be up to five. Further, a video encoder may disable the use of temporal motion vector candidates (e.g., in order to reduce the amount memory resources needed to store motion information at a video decoder) and signal whether the use of temporal motion vector candidates is enabled or disabled for a picture. FIG. 3 illustrates the position of spatial neighboring blocks and the temporal block that may be included in a set of candidate blocks for the merge mode in ITU-T H.265. The derivation of the set of candidates for merge mode in ITU-T H.265 includes determining the availability of A1, B1, B0, A0, and B2. It should be noted that a block is considered unavailable, if it is intra-predicted (i.e., does not have corresponding motion information) or is not included in the current slice (or tile). After determining the availability of A1, B1, B0, A0, and B2, a set of comparisons (illustrated as dashed arrows in FIG. 3) is performed to remove redundant entries from the set of candidates. For example, B2 is compared to B1 and if B1 has associated motion information that is equal to that of B2, it is removed from the set of candidates. The removal of entries from a set of candidates may be referred to as a pruning process. It should be noted that in FIG. 3, in order to reduce complexity, a complete comparison of candidates is not performed (e.g., A0 is not compared to B0) and as such, it is possible that redundant entries are included in the set of candidates.

Referring again to FIG. 3, the dashed block labeled Temp refers to the temporal candidate that may be included in the set of candidates. In ITU-T H.265 for merge mode, for the temporal candidate, a spatially collocated PU included in a reference picture is defined and the temporal candidate includes a block having a position just outside to the bottom right of the collocated PU, if available, or the block at the center position of the collocated PU. As described above, a maximum number of candidates that may be included in a set of candidate blocks is set. If the maximum number of candidates is set to N, N−1 spatial candidates and the temporal candidate are included in the set, in cases where the number of available spatial candidates (after pruning) and temporal candidate is greater than or equal to N. In cases where the number of available spatial candidates (after pruning) and temporal candidate is less than N, generated motion information is included in the set in order to fill the set.

Figure 4:
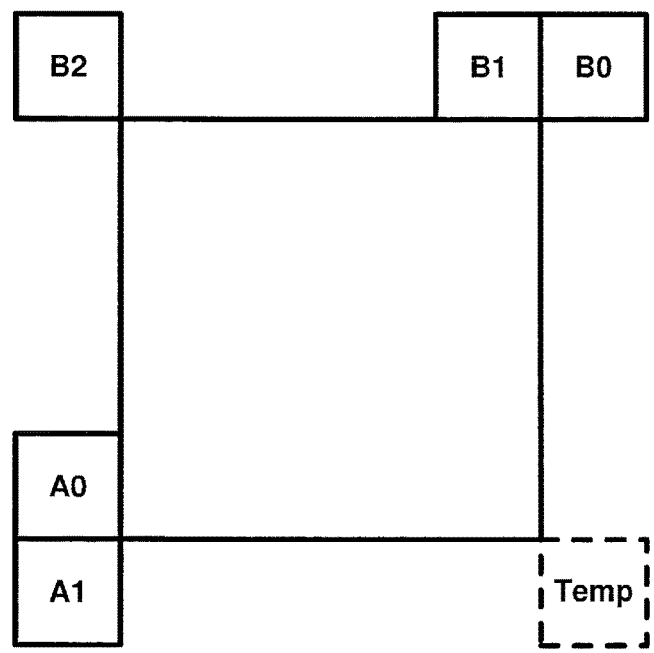
FIG. 4 is a conceptual diagram illustrating the position neighboring video blocks for inclusion in a set of candidate motion vector predictors in accordance with one or more techniques of this disclosure.

For AMVP in ITU-T H.265, referring to FIG. 4, the derivation of the set of candidates includes adding one of A0 or A1 (i.e., a left candidate) and one of B0, B1 or B2 (an above candidate) to the set based on their availability. That is, the first available left candidate and the first available above candidate are added to the set. When the left candidate and the above candidate have redundant motion vector components, one redundant candidate is removed from the set. If the number of candidates included in the set is less than two, and temporal motion vector prediction is enabled, the temporal candidate (Temp) is included in the set. In cases where the number of available spatial candidates (after pruning) and temporal candidate included in the set is less than two, a zero value motion vector is included in the set in order to fill the set.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.
x % y Modulus. Remainder of x divided by y, defined only for integers x and y with x>=0 and y>0.

Further, the following mathematical functions may be used:

Log 2(x) the base-2 logarithm of x;

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.
Floor(x) the largest integer less than or equal to x.

$$\text{Clip3}(x, y, z) = \begin{cases} x; & z < x \\ y; & z > y \\ z; & \text{otherwise} \end{cases}$$

$$\text{Sign}(x) = \begin{cases} 1; & x > 0 \\ 0; & x = 0 \\ -1; & x < 0 \end{cases}$$

$$\text{Abs}(x) = \begin{cases} x; & x >= 0 \\ -x; & x < 0 \end{cases}$$

Further, the following logical operators may be used:
x && y Boolean logical "and" of x and y
x || y Boolean logical "or" of x and y
! Boolean logical "not"
x ? y: z If x is TRUE or not equal to 0, evaluates to the value of y; otherwise, evaluates to the value of z.

Further, the following relational operators may be used:
> Greater than
>= Greater than or equal to
< Less than
<= Less than or equal to
== Equal to
!= Not equal to Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ A Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

JVET-L1001 includes a merge mode based on the merge mode defined in ITU-T H.265 and an AMVP mode based on the AMVP defined in ITU-T H.256. It should be noted that JVET-L1001 additionally includes affine motion vector prediction techniques. As described above, a motion vector may include a horizontal displacement component of the motion vector, a vertical displacement component of the motion vector, and a resolution for the motion vector. JVET-L1001 provides where luma motion vectors are derived at $\frac{1}{16}$ fractional-sample accuracy and chroma motion vectors are derived at in $\frac{1}{32}$ fractional-sample accuracy. In particular, JVET-L1001 provides that for luma motion vector prediction, the luma motion vector mvLX is derived as follows:

$$uLX[0]=(mvpLX[0]+mvdLX[0]+2^{18})\% \ 2^{18}$$

$$mvLX[0][0][0]=(uLX[0]>=2^{17})?(uLX[0]-2^{18}):uLX[0]$$

$$uLX[1]=(mvpLX[1]+mvdLX[1]+2^{18})\%2^{18}$$

$$mvLX[0][0][1]=(uLX[1]>=2^{17})?(uLX[1]-2^{18}):uLX[1]$$

where,
X is replaced with either 0 or 1, according to the corresponding motion prediction direction;
mvpLX is a motion vector predictor; and
mvdLX is a motion vector delta.

It should be noted that based on the equations above, the resulting values of mvLX[0] (which indicates the horizontal displacement direction (left or right) and magnitude) and mvLX[1] (which indicates the vertical displacement direction (up or down) and magnitude) as specified above will always be in the range of $-2^{17}$ to $2^{17}-1$, inclusive.

JVET-L1001 provides that for affine motion vectors a luma subblock motion vector array is derived at $\frac{1}{16}$ fractional-sample accuracy and a chroma subblock motion vector array vector is derived at in $\frac{1}{32}$ fractional-sample accuracy. In particular, JVET-L1001 provides that for luma affine control point motion vector predictor, the luma motion vectors cpMvLX[cpIdx] with cpIdx ranging from 0 to NumCpMv−1, are derived as follows:

$$uLX[cpIdx][0]=(mvpCpLX[cpIdx][0]+mvdCpLX[cpIdx][0]+2^{18})\%2^{18}$$

$$cpMvLX[cpIdx][0]=(uLX[cpIdx][0]>=2^{17})?(uLX[cpIdx][0]-2^{18}):uLX[cpIdx][0]$$

$$uLX[cpIdx][1]=(mvpCpLX[cpIdx][1]+mvdCpLX[cpIdx][1]+2^{18})\%2^{18}$$

$$cpMvLX[cpIdx][1]=(uLX[cpIdx][1]>=2^{17})?(uLX[cpIdx][1]-2^{18}):uLX[cpIdx][1]$$

where,
X is replaced with either 0 or 1, according to the corresponding motion prediction direction;
mvpCpLX is a control point motion vector predictor; and
mvdCpLX is a control point motion vector delta.

It should be noted that based on the equations above, the resulting values of cpmvLX[0] and cpmvLX[1] as specified above will always be in the range of $-2^{17}$ to $2^{17}-1$, inclusive. As described above, a motion vector candidate may include a temporal candidate, where a temporal candidate may include motion information associated with a collocated block included in a reference picture. In particular, JVET-L1001 provides the following with respect to the derivation of collocated motion vectors:
Inputs to this process are:
- a variable currCb specifying the current coding block,
- a variable colCb specifying the collocated coding block inside the collocated picture specified by ColPic,
- a luma location (xColCb, yColCb) specifying the top-left sample of the collocated luma coding block specified by colCb relative to the top-left luma sample of the collocated picture specified by ColPic,
- a reference index refIdxLX, with X being 0 or 1,
- a flag indicating a subblock temporal merging candidate sbFlag.

Outputs of this process are:
- the motion vector prediction mvLXCol in 1/16 fractional-sample accuracy,
- the availability flag availableFlagLXCol.

The variable currPic specifies the current picture.
The arrays predFlagL0Col[x][y], mvL0Col[x][y] and refIdxL0Col[x][y] are set equal to PredFlagL0[x][y], MvL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvL1[x][y] and RefIdxL1[x][y], respectively, of the collocated picture specified by ColPic.
The variables mvLXCol and availableFlagLXCol are derived as follows:
  If colCb is coded in an intra prediction mode, both components of mvLXCol are set equal to 0 and availableFlagLXCol is set equal to 0.
  Otherwise, the motion vector mvCol, the reference index refIdxCol and the reference list identifier listCol are derived as follows:
    If sbFlag is equal to 0, availableFlagLXCol is set to 1 and the following applies:
      If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.
      Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.
      Otherwise (predFlagL0Col[xColCb][yColCb] is equal to 1 and predFlagL1Col[xColCb][yColCb] is equal to 1), the following assignments are made:
        If NoBackwardPredFlag is equal to 1, mvCol, refIdxCol and listCol are set equal to mvLXCol[xColCb][yColCb], refIdxLXCol[xColCb][yColCb] and LX, respectively.
        Otherwise, mvCol, refIdxCol and listCol are set equal to mvLNCol[xColCb][yColCb], refIdxLNCol[xColCb][yColCb] and LN, respectively, with N being the value of collocated_from_l0_flag.
    Otherwise (sbFlag is equal to 1), the following applies:
      If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.
      Otherwise (PredFlagLXCol[xColCb][yColCb] is equal to 0), the following applies:
        If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set to 1.
        Both the components of mvLXCol are set to 0 and availableFlagLXCol is set equal to 0.
      When availableFlagLXCol is equal to TRUE, mvLXCol and availableFlagLXCol are derived as follows:
        If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.
        Otherwise, the variable availableFlagLXCol is set equal to 1, refPicListCol[refIdxCol] is set to be the picture with reference index refIdxCol in the reference picture list listCol of the slice containing coding block colCb in the collocated picture specified by ColPic, and the following applies:

$$colPocDiff = DiffPicOrderCnt(ColPic, refPicListCol[refIdxCol])$$

$$currPocDiff = DiffPicOrderCnt(currPic, RefPicListX[refIdxLX])$$

If RefPicListX[refIdxLX] is a long-term reference picture, or colPocDiff is equal to currPocDiff, mvLXCol is derived as follows:

$$mvLXCol = mvCol$$

Otherwise, mvLXCol is derived as a scaled version of the motion vector mvCol as follows:

$$tx = (16384 + (Abs(td) >> 1))/td$$

$$distScaleFactor = Clip3(-4096, 4095, (tb*tx+32) >> 6)$$

$$mvLXCol = Clip3(-32768, 32767, Sign(distScaleFactor*mvCol)*((Abs(distScaleFactor*mvCol)+127) >> 8))$$

where td and tb are derived as follows:

$$td = Clip3(-128, 127, colPocDiff)$$

$$tb = Clip3(-128, 127, currPocDiff)$$

where,
The function LongTermRefPic(aPic, aPb, refIdx, LX), with X being 0 or 1, may be defined as follows:
  If the picture with index refIdx from reference picture list LX of the slice containing prediction block aPb in the picture aPic was marked as "used for long term reference" at the time when aPic was the current picture, LongTermRefPic(aPic, aPb, refIdx, LX) is equal to 1.
  Otherwise, LongTermRefPic(aPic, aPb, refIdx, LX) is equal to 0.
And
The function DiffPicOrderCnt(picA, picB) is specified as follows:

$$DiffPicOrderCnt(picA, picB) = PicOrderCnt(picA) - PicOrderCnt(picB)$$

As such, in order to support temporal motion vector prediction, motion information from a previous coded picture is stored. Typically, such information is stored in a temporal motion buffer. That is, a temporal motion buffer may include motion vectors determined in previously coded pictures that may be used for predicting motion vectors for current block in a current picture. For example, as provided above, in order to derive mvLXCol, 18-bit MvLX[x][y] values from a collocated picture are needed. It should be noted that the motion vectors are typically stored to a temporal motion buffer using a finite set of precisions, i.e., at the same precision as the derived motion vector. Further, one motion vector corresponding to each reference picture list may be stored for a block of samples. One reference index corresponding to the picture referenced by the motion vector may be stored. A prediction mode may be stored in the temporal buffer (e.g., inter or not-inter) for each block of a previously picture. Further, an inter prediction sub-mode may be stored for the block of samples (e.g., luma illumination compensation mode flag).

Thus, enabling temporal motion vector prediction using a typically temporal motion buffer may require significant memory costs. According to the techniques described herein, the resolution of motion information may be varied to optimize the coding efficiency improvements resulting from temporal motion vector prediction while mitigating the memory costs of implementing a temporal motion buffer. It should be noted that there may be two approaches to mitigating the memory costs of implementing a temporal motion buffer. The approaches may be combined or used independently. One approach is a proprietary implementation of a temporal motion buffer that utilizes lossless compression techniques of motion information. For example, referring to the derivation of mvLXCol above, a set of 18-bit MvLX[x][y] values may be stored in a temporal motion buffer implementation using a lossless compression technique. Another approach is to enable a temporal motion vector to be derived in a manner that requires less than the full precision of temporal motion information. For example, according to the techniques herein, as described in further below, the derivation of mvLXCol above for a current picture may be modified such that mvLXCol may be derived from an 16-bit value of MvLX[x][y] from the collocated picture.

Figure 5:
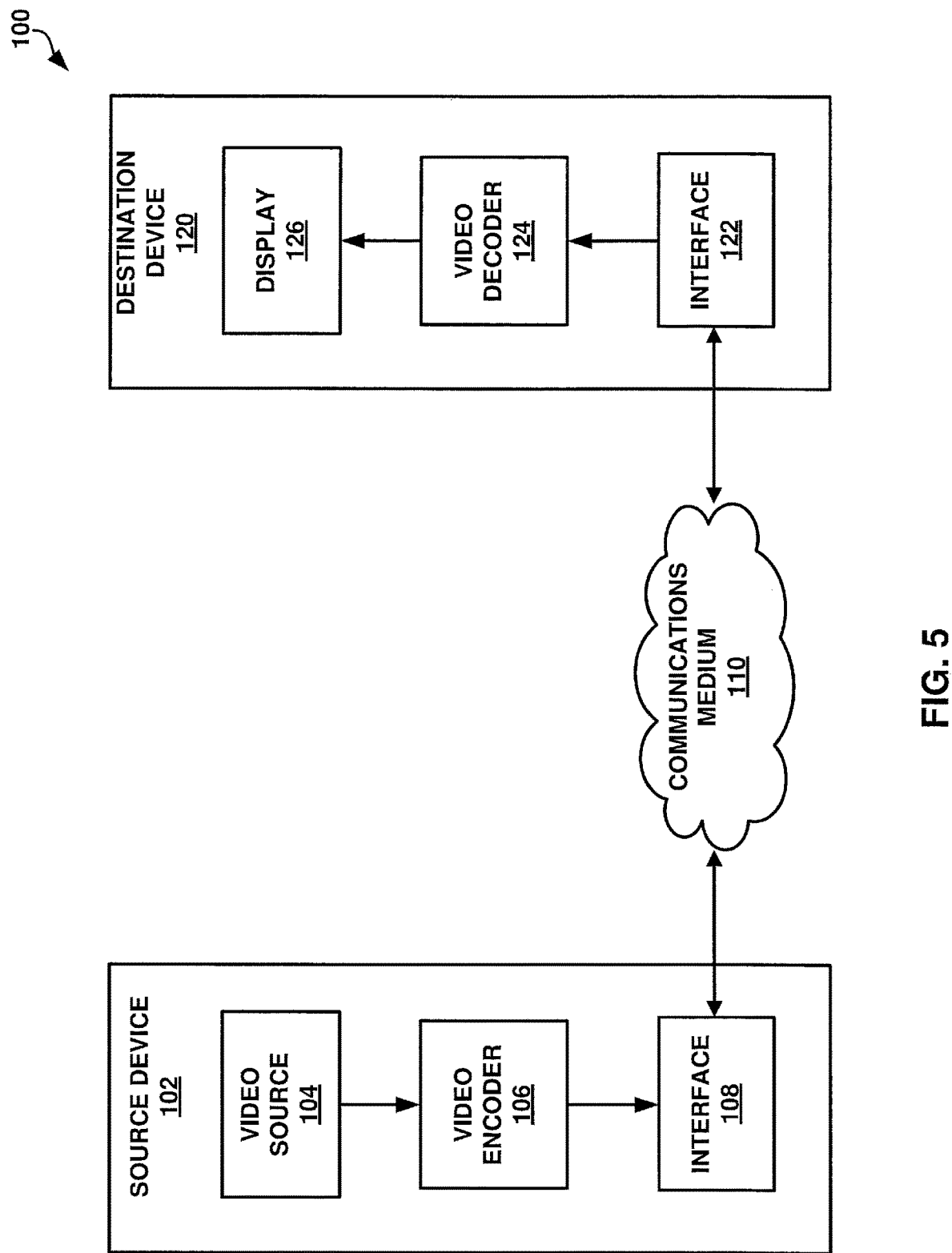
FIG. 5 is a block diagram illustrating an example of a system that may be configured to encode and decode video data according to one or more techniques of this disclosure.

FIG. 5 is a block diagram illustrating an example of a system that may be configured to code (i.e., encode and/or decode) video data according to one or more techniques of this disclosure. System 100 represents an example of a system that may perform video coding using motion vector prediction techniques described according to one or more examples of this disclosure. As illustrated in FIG. 5, system 100 includes source device 102, communications medium 110, and destination device 120. In the example illustrated in FIG. 5, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 5, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device.

For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 5, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 8, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
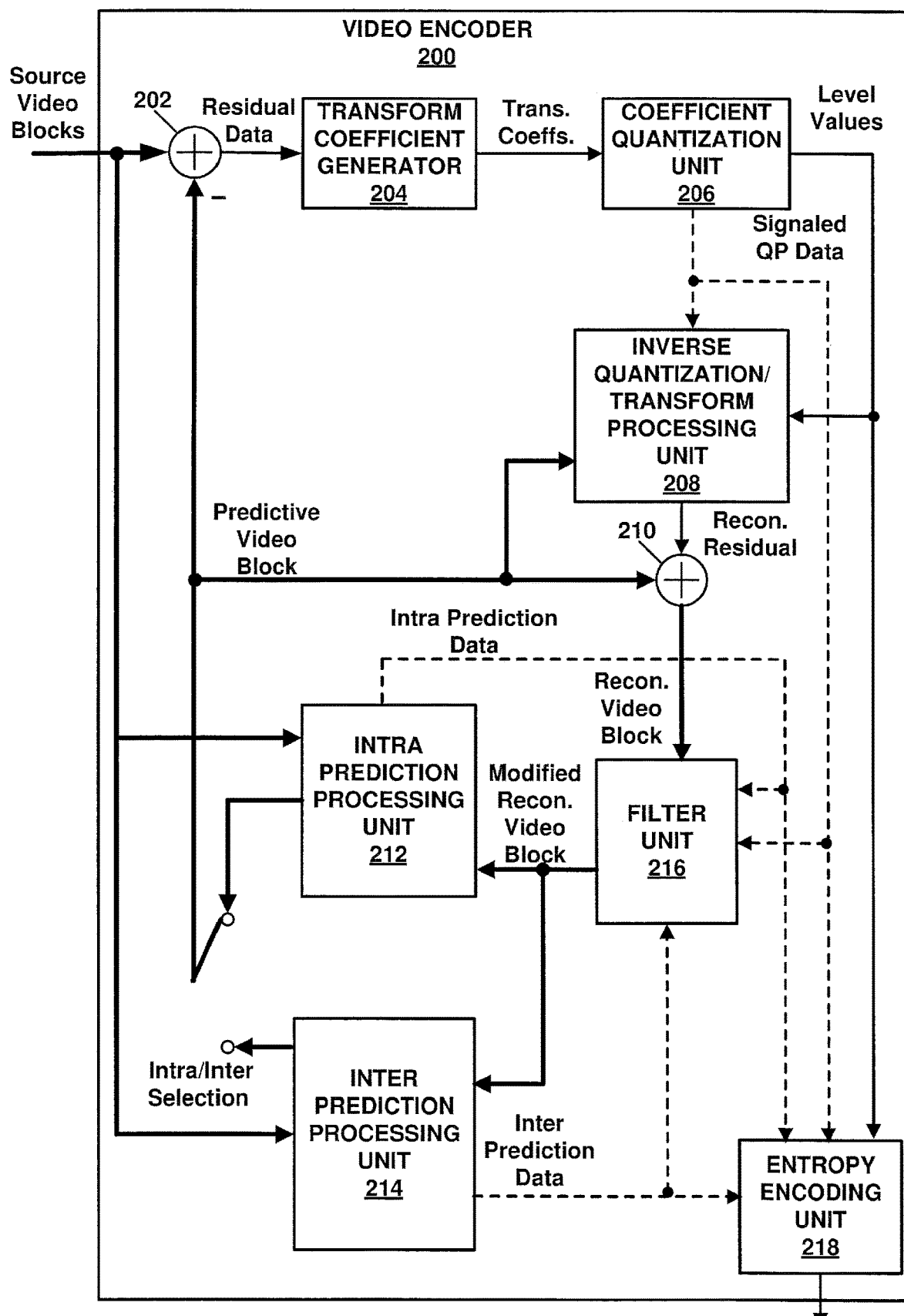
FIG. 6 is a block diagram illustrating an example of a video encoder that may be configured to encode video data according to one or more techniques of this disclosure.

FIG. 6 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 6, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional subdivisions of source video blocks. It should be noted that some techniques described herein may be generally applicable to video coding, regardless of how source video data is partitioned prior to and/or during encoding. In the example illustrated in FIG. 6, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206. Coefficient quantization unit 206 may be configured to perform quantization of the transform coefficients. As described above, the degree of quantization may be modified by adjusting a quantization parameter. Coefficient quantization unit 206 may be further configured to determine quantization parameters (QP) and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 6, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 6, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction mode. Intra prediction processing unit 212 may be configured to select an intra prediction mode for a current video block. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204. As described above, possible intra prediction modes may include planar prediction modes, DC prediction modes, and angular prediction modes. Inter prediction processing unit 214 may be configured to perform inter prediction coding for a current video block. Inter prediction processing unit 214 may be configured to receive source video blocks and calculate motion information for PUs of a video block. A motion vector may indicate the displacement of a PU (or similar coding structure) of a video block within a current video frame relative to a predictive block within a reference frame. Inter prediction coding may use one or more reference pictures. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Further, motion prediction may be unipredictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. Inter prediction processing unit 214 may output motion prediction data for a calculated motion vector to entropy encoding unit 218.

As described above, motion information may be determined and specified according to motion vector prediction techniques. Inter prediction processing unit 214 may be configured to perform motion vector prediction techniques, including for example, those described above. Further, inter prediction processing unit 214 may be configured to perform motion vector prediction according to techniques described above. In particular, inter prediction processing unit 214 may be configured to perform temporal motion vector prediction. As described above, enabling temporal motion vector prediction using a typically temporal motion buffer may require significant memory costs.

In one example, according to the techniques herein, inter prediction processing unit 214 may be configured to store values representing a motion vector using a reduced number of bits compared to the number of bits of a derived motion vector (i.e., the motion vector that is used to generate a prediction block). It should be noted that in addition to and/or as an alternative to the ways for specifying a motion vector provided above, there may be several ways to specify a motion vector (e.g., polar coordinates, etc.). The techniques described herein may be generally applicable regardless of how a motion vector is specified.

As described above, enabling temporal motion vector prediction using a typical temporal motion buffer may require significant memory costs. In one example, a temporal motion buffer may contain the following fields for each block (e.g., PU in ITU-T H.265) or sub-block:

A 1-bit flag indicating the whether the block is coded using inter-prediction, e.g., field isInter;

A 2-bit flag indicating an inter prediction direction, e.g., field interDir (e.g., list 0, list 1, or bi-prediction);

An unsigned 16-bit membership identifier for set of tiles, e.g., field tileSetIdx;

An unsigned 16-bit slice index value, e.g., field sliceIdx;

For each motion vector component, a signed 18-bit integer. For example, field mv[MAX_RPL_COUNT][2], where [2] represents horizontal and vertical displacement directions and MAX_RPL_COUNT is 2 and corresponds to list0 and list1.

An array of unsigned 4-bit integer indicating a reference picture index, e.g., referenceIdx[MAX_RPL_COUNT].

It should be noted that an unsigned 4-bit value can indicate a reference picture index, as the maximum number of pictures in a reference picture list (RPL) in JVET-L1001 is 16. Further, it should be noted that in some cases MAX_RPL_COUNT may increase, e.g., if additional reference picture lists are supported.

As described above, in JVET-L1001, mvLX[0] and mvLX[1] are each derived as 18-bit values. Further, in in JVET-L1001, cpmvLX[0] and cpmvLX[1] are each derived 18-bit values. In one example, according to the techniques herein, mvLX[0], mvLX[1], cpmvLX[0] and cpmvLX[1] may be stored to a temporal motion buffer as N-bit values, where N is less than 18 or more generally, where N is less than the number of bits of a derived value of a motion vector component. In one example, a value representing a motion vector component may be clipped to a range such that it is represented with N-bits before being stored in a temporal motion buffer. For example, $MV_x$ may be stored as $Clip3(-2^{15}, 2^{15}-1, MV_x)$ and $MV_y$ may be stored as $Clip3(-2^{15}, 2^{15}-1, MV_y)$. With respect to the derivation of collocated motion vectors in JVET-L1001 provided above, in the case where a value representing a motion vector component is clipped, in one example, the stored value of mvCol may be as follows:

mvCol=Clip3(-(1<<(N-1)),(1<<(N-1))-1,mvCol)

In another example, only a subset of N MSB-bits of a derived motion vector component may be stored to a temporal motion buffer. For example, for $MV_x$ and $MV_y$, the following values may be stored to temporal motion buffer:

$MVDD_x=MV_x/4$; and $MVDD_y=MV_y/4$

In this example, during a read from the temporal motion buffer, reconstructed values of $MV_x$ and $MV_y$, $MV_{xR}$ and $MV_{yR}$ may be derived as follows:

$MV_{xR}=4*MVDD_x$; and $MV_{yR}=4*MVDD_y$

With respect to the derivation of collocated motion vectors in JVET-L1001 provided above, in the case where only a subset of N MSB-bits of a derived motion vector component are stored to a temporal motion buffer, in one example, the stored value of mvCol may be as follows:

mvCol=(mvCol>>4)

and the derived value of mvCol may be as follows:

mvCol=(mvCol<<4)

It should be noted that in some cases, $MV_{xR}$ and/or $MV_{yR}$ may be equal to $MV_x$ and $MV_y$ and in other cases $MV_{xR}$ and/or $MV_{yR}$ are not equal to $MV_x$ and $MV_y$. Thus, in some examples, a delta value may be conditionally provided for $MV_{xR}$ and/or $MV_{yR}$, such that $MV_x$ and/or $MV_y$ can be derived in cases where $MV_{xR}$ and/or $MV_{yR}$ are not equal to $MV_x$ and $MV_y$. For example, in one example, a temporal motion buffer may include a flag for each $MV_{xR}$ and $MV_{yR}$ entry indicating whether a corresponding delta value is present in the temporal motion buffer. In this case, with respect to the derivation of collocated motion vectors in JVET-L1001 provided above, in one example, the stored value of mvCol may be as follows:

mvCol=(mvCol>>4)

and the derived value of mvCol may be as follows:

mvCol=(mvCol<<4)+delta value, where the delta value is conditionally present based on the value of a flag and inferred to be zero when not present.
In another example, only a subset N of LSB-bits of a derived motion vector component may be stored. For example, a motion vector component derived as X-bits and may be stored as N-bits, where the (N−X) MSB-bits are not stored. In one example, the (N−X) MSB-bits may be obtained using adjacent spatial motion vectors (e.g., by averaging adjacent spatial motion vectors or for example, using motion vector(s) at predetermined location(s) in a predetermined priority to derive the (N−X) MSB bits). For example, in one example, a temporal motion buffer may include a delta value for deriving the (N−X) MSB bits from adjacent spatial motion vector(s). In this case, with respect to the derivation of collocated motion vectors in JVET-L1001 provided above, in one example, the stored value of mvCol may be as follows:

mvCol=(mvCol&LSBMask), where
LSBMask=0x000000FF and the derived value of mvCol may be as follows:

mvCol=mvCol|(mvAdjacent&MSBMask), where
MSBMask=0xFFFFFF00 and mvAdjacent is
derived from spatially adjacent motion vectors
for e.g., one at left of current block Further, in another example, the techniques above may be combined such that, for an A-bit motion vector component, a subset of bits not including the B MSB bits and not including the C LSBs is stored (i.e., the middle bits are stored).
In another example, higher resolutions may be used for storing small motion vector components. For example, a motion vector component may be determined as a small motion vector component if the derived motion vector component is in a particular range (e.g., $2^{15}$ to $(2^{15}-1)$, inclusive). In one example, the range may be NULL (i.e., a small motion vector flag is not signaled and inferred to 0). In one example, a flag may be stored to/read from temporal motion buffer that indicates whether a motion vector is a small motion vector. In this case, in one example, when a motion vector component is a small motion vector component, a small motion vector flag is set to 1 and the small motion vector value is stored (e.g., at 1/16-pel resolution) and when a motion vector component is not a small motion vector component, a small motion vector flag is set to 0 and the motion vector component is scaled (e.g., scale by dividing by 4 (right shift by 2 with/without rounding offset of 1)) and stored (e.g., stored at 1/4-pel resolution). Further, in this case, when the small motion vector component is read from the temporal motion buffer, when the small motion vector flag is 1 (which may be inferred based on the range of the value being read from the motion buffer), the motion vector component value is read from the temporal motion buffer at the resolution associated with a small motion vector and when the small motion vector flag is 0, the motion vector value is read from the temporal motion buffer at the other determined resolution (e.g., at 1/4-pel resolution) and is scaled (e.g., multiply by 4—left shift by 2) to the small motion vector resolution (e.g., 1/16-pel resolution). In this case, with respect to the derivation of collocated motion vectors in JVET-L1001 provided above, in one example, the stored value of mvCol may be as follows:

mvCol=(smallMotionVectorFlag)?mvCol:
(mvCol>>2)

and the derived value of mvCol may be as follows:

mvCol=(smallMotionVectorFlag)?mvCol:
(mvCol<<2)

In another example, if a stored value is near the wrapping edge of N-bits, (e.g., 8-bits for the LSBs and LSBs value >229 OR LSBs value <25), then an automatic subtraction/addition (e.g., of 128) may be applied for the stored value. In one example, the subtraction/addition may be predicted using the average of spatial candidates of current picture. In one example, the motion vectors may be clipped to 8-bits, and if the value is +/−128, then it is not included as a candidate. In one example, a shift factor may be signaled, and then the shift factor may be applied before clipping. In this example, if the result is at the clip point, in some cases, it may not be included as a motion vector candidate. For example, if a derived motion vector is 0x0F, the 4 LSB bits is 0xF. If the average of spatial candidates is 0x10, simply concatenating 0x10 to 0x0F provides 0x1F, which may not be desirable. So, in one example, when the wrapping edge is approached an operation that moves the LSB bits away from the wrapping edge may be performed (e.g., add 0x7). The operation may then be reversed after the concatenation. So, for the above case, in one example, 0x0F+0x07=0x16 may be performed and 0x6 may be stored. In this case, the spatial average would become 0x10+0x07=0x17. Concatenation would give 0x16, and finally removal of the addition proves: 0x16+0x07=0x0F. In one example, whether the wraparound edge is being approached may be determined by comparing with thresholds (e.g., 229 and 25).

In one example, according to the techniques herein, inter prediction processing unit 214 may be configured to store a value representing a motion vector component using a clipping range corresponding to the precision of the motion vector computation. As provided above, in JVET-L1001, scaling of motion temporal/spatial/derived motion vector predictors is based on picture order count (POC) distances, where the POC distance corresponds to temporal distance between pictures. A reference motion vector may be scaled to a target picture based on the ratio of POC distance between predicted and reference picture of the reference motion vector, and the POC distance between current predicted and reference picture. The scaled motion vector may be used as a prediction. The temporal/spatial/derived motion vector scaling operation may be followed by a clipping operation (e.g., Clip3($2^{15}$,$2^{15}-1$, scaledMv), where scaledMv is motion vector component having a scaled motion vector displacement direction) for each of the scaled motion vector displacement direction. In this case, when using the 1/16-pel motion vectors in the decoding process it is desirable that the clipping bounds are not unnecessarily restrictive, as this can lead to the clipping of large motion vectors. In one example, according to the techniques herein, inter prediction processing unit 214 may be configured to allow for the greater bit-depth (e.g., 18-bits) of the scaled motion vector displacement direction the clipping bounds needed to be increased (e.g., Clip3($-2^{17}$, $2^{17}-1$, scaledMv). In this case, with respect to the derivation of collocated motion vectors in JVET-L1001 provided above, in one example, mvCol and mvLXCol may be derived as follows:

mvCol=Clip3(−131072,131071,Sign
(distScaleFactor*mvCol)*((Abs
(distScaleFactor*mvCol)+127)>>8))

mvLXCol=Clip3(−131072,131071,Sign
(distScaleFactor*mvCol)*((Abs
(distScaleFactor*mvCol)+127)>>8))

Further, in this case, other motion vector prediction candidates may be clipped in a similar manner.

In one example, according to the techniques herein, inter prediction processing unit 214 may be configured to use a subset of bits for a pruning process comparison. As described above, a pruning process may be used to remove redundant entries from a set of motion vector candidates. In one example, according to technique herein, a pruning process may use a subset of bits to determine whether motion candidates are redundant and thus, whether a motion candidate is added to a candidate list. Further, in one example, according to technique herein, a pruning process may be used to determine whether motion information for a block is stored to a temporal motion buffer. In one example, a pruning process may use only a subset of bits of a motion vector component for purposes of comparisons. For example, the only x LSB bits of a motion vector component are used for comparison or only x MSB bits of a motion vector component are used for comparison.

In one example, according to the techniques herein, inter prediction processing unit 214 may be configured to use normalization for reducing the bit-depth of motion vectors stored to a temporal motion buffer. For example, an example architecture of a temporal motion buffer may contain the following 82 bits (or 90 bits) per 16×16 block:
- 4 MV components of 16 bits (or 18 bits) each
- 2 delta POC values of 8 bits each
- 2 LTRP (long term reference picture) flags of 1 bit each In one example, according to the techniques herein, to reduce memory bandwidth, it may be desirable to reduce the storage requirement to 64-bits. In one example, the storage requirements may be reduced by (1) storing a normalized motion vector (e.g., normalizing with respect to a delta POC, which then would not have to be stored); (2) use a floating-point type representation for the normalized motion vector (presumably, 1/16 precision is not terribly useful for large motion vectors); and/or clip to a reduced range (i.e., normalized MVs should not be as large). In one example, normalizing with respect to a delta POC may include determining an initial POC difference value representing the difference in POC values of current picture and reference current picture. For reduced storage the POC difference value may be scaled to a constant value (e.g., 1, 2, 4) and the corresponding motion vector may be appropriately scaled considering the ratio of the original POC difference and the new POC difference. The motion vector scaling may be followed by a clipping operation (i.e., during storage). The choice of a constant POC difference in addition to reducing storage also simplifies the temporal scaling operation which typically includes taking a ratio of two POC differences, one corresponds to difference between the current picture's POC and the reference picture POC, while the other corresponds to the difference between the temporal picture's POC and the temporal picture's reference picture POC. During the storage the latter may be set to a constant thereby reducing the computation complexity of ratio of two POC difference. For example, if the denominator is 1 then the division operation can be skipped, or if the denominator is a power of 2 then the division operation becomes a bit shift operation. The normalization operation may further be based on whether the motion vector references long term reference pictures. For example, motion vectors referencing long term reference pictures may not be normalized. In this case, with respect to the derivation of collocated motion vectors in JVET-L1001 provided above, in one example, mvCol may be derived as follows: When the Picture corresponding to refPicListCol[refIdxCol] is not a long-term reference picture the following sequential steps are carried out:

$$colPocDiff=DiffPicOrderCnt(ColPic, refPicListCol[refIdxCol])$$

$$newColPocDiff=CONSTANT$$

$$tx=(16384+(Abs(td)>>1))/td$$

$$distScaleFactor=Clip3(-4096,4095,(tb*tx+32)>>6)$$

$$mvCol=Clip3(-131072,131071,Sign(distScaleFactor*mvCol)*((Abs(distScaleFactor*mvCol)+127)>>8))$$

where td and tb are derived as follows:

$$td=Clip3(-128,127,colPocDiff)$$

$$tb=Clip3(-128,127,newColPocDiff)$$

When availableFlagLXCol is equal to TRUE, mvLXCol and availableFlagLXCol are derived as follows:
  If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.
  Otherwise, the variable availableFlagLXCol is set equal to 1, refPicListCol[refIdxCol] is set to be the picture with reference index refIdxCol in the reference picture list listCol of the slice containing coding block colCb in the collocated picture specified by ColPic, and the following applies:

$$colPocDiff=newColPocDiff$$

$$currPocDiff=DiffPicOrderCnt(currPic, RefPicListX[refIdxLX])$$

If RefPicListX[refIdxLX] is a long-term reference picture, or colPocDiff is equal to currPocDiff, mvLXCol is derived as follows:

$$mvLXCol=mvCol$$

Otherwise, mvLXCol is derived as a scaled version of the motion vector mvCol as follows:

$$tx=(16384+(Abs(td)>>1))/td$$

$$distScaleFactor=Clip3(-4096,4095,(tb*tx+32)>>6)$$

$$mvLXCol=Clip3(-131072,131071,Sign(distScaleFactor*mvCol)*((Abs(distScaleFactor*mvCol)+127)>>8))$$

where td and tb are derived as follows:

$$td=Clip3(-128,127,colPocDiff)$$

$$tb=Clip3(-128,127,currPocDiff)$$

As described above, in one example, the storage requirements of a temporal motion buffer may be reduced by storing a normalized motion vector; using a floating-point type representation for the normalized motion vector; and/or clipping to a reduced range. Further, in one example, the storage requirements of a temporal motion buffer may be reduced by converting motion vector displacements to a Mantissa-Exponent representation prior to storage. In one example, if the range of the representation is greater than a threshold (e.g., 18-bits), then no clipping of motion vector displacement is needed. In one example, the mantissa may take 6-bits and range from −32 to 31 (inclusive) and the exponent may take 4-bits and range from 0 to 15 (inclusive). Further, in one example, motion vectors referencing long-term picture may also be scaled and/or converted to floating point representation prior to storage.

In one example, Mantissa-Exponent representation of number may be computed as follows:

```
int convertNumberToMantissaExponentForm( int number )
{
  int mantissa = number;
  int exponent = 0;
  if ( number < MV_MANTISSA_LOWER_LIMIT || number >
MV_MANTISSA_UPPER_LIMIT )
    {
      exponent = 1;
      while ( number < -( 1 << ( exponent + MV_MANTISSA_BITCOUNT - 1 ) ) ||
         number > ( ( 1 << ( exponent + MV_MANTISSA_BITCOUNT - 1 ) ) - 1 ) )
      {
        exponent++;
      }
      mantissa = ( number >> ( exponent - 1 ) ) ^ MV_MANTISSA_LIMIT;
    }
    int mantissaExponentForm = exponent | ( mantissa << MV_EXPONENT_BITCOUNT );
    return mantissaExponentForm;}
```

Where, static const int MV_EXPONENT_BITCOUNT=4;

static const int MV_MANTISSA_BITCOUNT=6;

static const int MV_MANTISSA_LOWER_
       LIMIT=-(1<<(MV_MANTISSA_BITCOUNT-
       1));

static const int MV_MANTISSA_UPPER_LIMIT=
       ((1<<(MV_MANTISSA_BITCOUNT-1))-1);

static const int MV_MANTISSA_LIMIT=(1<<
       (MV_MANTISSA_BITCOUNT)-1); and static const int MV_EXPONENT_MASK=
       ((1<<MV_EXPONENT_BITCOUNT)-1);

Further, conversion to a number from a Mantiss-Exponent representation may be done as follows:

```
int convertMantissaExponentFormToNumber( int mantissaExponentForm )
{
  int exponent = mantissaExponentForm & MV_EXPONENT_MASK;
  int mantissa = mantissaExponentForm >>
MV_EXPONENT_BITCOUNT;
  if ( exponent == 0 )
  {
    return mantissa;
  }
  else
  {
    return ( ( mantissa ^ MV_MANTISSA_LIMIT ) << ( exponent - 1 ));
  }
}
```

Thus, in one example, according to the techniques herein, the derivation of collocated motion vectors may be as follows:
Inputs to this process are:
  a variable currCb specifying the current coding block,
  a variable colCb specifying the collocated coding block inside the collocated picture specified by ColPic,
  a luma location (xColCb, yColCb) specifying the top-left sample of the collocated luma coding block specified by colCb relative to the top-left luma sample of the collocated picture specified by ColPic,
  a reference index refIdxLX, with X being 0 or 1,
  a flag indicating a subblock temporal merging candidate sbFlag.

Outputs of this process are:
  the motion vector prediction mvLXCol in 1/16 fractional-sample accuracy,
  the availability flag availableFlagLXCol.
The variable currPic specifies the current picture.
The arrays predFlagL0Col[x][y], mvL0Col[x][y] and refIdxL0Col[x][y] are set equal to PredFlagL0[x][y], MvL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvL1[x][y] and RefIdxL1[x][y], respectively, of the collocated picture specified by ColPic.
The variables mvLXCol and availableFlagLXCol are derived as follows:
  If colCb is coded in an intra prediction mode, both components of mvLXCol are set equal to 0 and availableFlagLXCol is set equal to 0.
  Otherwise, the motion vector mvCol, the reference index refIdxCol and the reference list identifier listCol are derived as follows:
    If sbFlag is equal to 0, availableFlagLXCol is set to 1 and the following applies:
      If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.
      Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.
      Otherwise (predFlagL0Col[xColCb][yColCb] is equal to 1 and predFlagL1Col[xColCb][yColCb] is equal to 1), the following assignments are made:
        If NoBackwardPredFlag is equal to 1, mvCol, refIdxCol and listCol are set equal to mvLXCol[xColCb][yColCb], refIdxLXCol[xColCb][yColCb] and LX, respectively.
        Otherwise, mvCol, refIdxCol and listCol are set equal to mvLNCol[xColCb][yColCb], refIdxLNCol[xColCb][yColCb] and LN, respectively, with N being the value of collocated_from_l0_flag.

Otherwise (sbFlag is equal to 1), the following applies:

If PredFlagLXCol[xColCb][yColCb] is equal to 1, mvCol, refIdxCol, and listCol are set equal to mvLXCol[xColCb][yColCb], refIdxLXCol [xColCb] [yColCb], and LX, respectively, availableFlagLXCol is set to 1.

Otherwise (PredFlagLXCol[xColCb][yColCb] is equal to 0), the following applies:

If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCb] [yColCb], refIdxLYCol[xColCb] [yColCb] and LY, respectively, with Y being equal to !X where X being the value of X this process is invoked for. availableFlagLXCol is set to 1.

Both the components of mvLXCol are set to 0 and availableFlagLXCol is set equal to 0.

When availableFlagLXCol is equal to TRUE, mvLXCol and availableFlagLXCol are derived as follows:

If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing coding block colCb in the collocated picture specified by ColPic, and the following applies:

colPocDiff=DiffPicOrderCnt(ColPic,refPicListCol [refIdxCol])

currPocDiff=DiffPicOrderCnt(currPic,RefPicListX [refIdxLX])

mvColScaled is derived as a scaled version of the motion vector mvCol as follows:

$tx$Scaled=(16384+(Abs($td$Scaled)>>1))/4 distScaleFactor=Clip3(−4096,4095,(4*$tx$Scaled+ 32)>>6)

mvColScaled=Clip3(−32768,32767,Sign (distScaleFactor*mvCol)*((Abs (distScaleFactor*mvCol)+127)>>8))

where tdScaled is derived as follows:

$td$Scaled=Clip3(−128,127,colPocDiff)

The derivation process to convert motion vector displacement to mantissa and exponent representation as specified in Clause A (below) is invoked with mvColScaled as input, and the output is assigned to mvColScaledME.

The derivation process for motion vector displacement from mantissa and exponent representation as specified in Clause B (below) is invoked with mvColScaledME as input, and the output is assigned to mvColScaledQ.

If RefPicListX[refIdxLX] is a long-term reference picture, or colPocDiff is equal to currPocDiff, mvLXCol is derived as follows:

mvLXCol=mvColScaledQ

Otherwise, mvLXCol is derived as a scaled version of the motion vector mvColScaledQ as follows:

$tx$=4096 distScaleFactor=Clip3(−4096,4095,($tb$*$tx$+32)>>6)

mvLXCol=Clip3(−32768,32767,Sign (distScaleFactor*mvColScaledQ)*((Abs (distScaleFactor*mvColScaledQ)+127)>>8))

where tb is derived as follows:

$tb$=Clip3(−128,127,currPocDiff)

Clause A Derivation Process to Convert Motion Vector Displacement to Mantissa and Exponent Representation Inputs to this process are:
 a variable mvColScaled specifying the scaled temporal motion vector, Outputs of this process are:
 a variable mvColScaledME specifying the mantissa plus exponent representation of the scaled temporal motion vector The variables mantissa and exponent are derived as follows:

```
exponent = 0
if ( mvColScaled < −32 || mvColScaled > 31 ) {
  exponent = 1
  while ( mvColScaled < −( 1 << ( exponent + 5 ) ) || mvColScaled >
(( 1 << ( exponent + 5 ) ) − 1 ) ) {
    exponent++
  }
  mantissa = ( number >> ( exponent − 1 ) ) ^ 32
}
```

The variable mvColScaledME is derived as follows:

mvColScaledME=exponent|(mantissa<<4)

Clause B Derivation Process for Motion Vector Displacement from Mantissa and Exponent Representation Inputs to this process are:
 a variable mvColScaledME specifying the scaled temporal motion vector in mantissa plus exponent representation, Outputs of this process are:
 a variable mvColScaledQ specifying the scaled temporal motion vector derived from its mantissa plus exponent representation The variables mantissa and exponent are derived as follows:

exponent=mvColScaledME&15 mantissa=mvColScaledME>>4

The variable mvColScaledQ is derived as follows:

```
if ( exponent == 0 )
  mvColScaledQ = mantissa
else
  mvColScaledQ = ( ( mantissa ^ 32 ) << ( exponent − 1 ) );
```

In one example, according to the techniques herein, the mantissa and exponent to predetermined values (e.g. −32 and 15, respectively) to indicate a temporal motion vector displacement is not available for motion prediction. For example, when intra mode is used, all four motion vector displacement direction values are assigned a mantissa of −32 and exponent of 15. Similarly, when only one of the two motion vectors are valid (e.g. inter_pred_idc[ ][ ] is PRED_L0 or PRED_L1), then the motion vector with no valid motion information is assigned a mantissa and exponent of −32 and 15 for both the displacement directions. This approach to indicate availability may be applied for temporal motion information that corresponds to current picture referencing as well.

In one example, computing Mantissa-Exponent representation of number may comprise of a two-step process. A first step determines the quantization interval, and second step adds half the quantization interval and then quantizes. The Mantissa-Exponent representation may be computed as follows:

```
int convertNumberToMantissaExponentForm( int number )
{
  int mantissa = 0;
  int exponent = 0;
  if ( number < MV_MANTISSA_LOWER_LIMIT | | number >
MV_MANTISSA_UPPER_LIMIT )
    {
    // determine quantization interval
    exponent++;
    while ( number < −( 1 << ( exponent + MV_MANTISSA_BITCOUNT − 1 ) ) | |
        number > ( ( 1 << ( exponent + MV_MANTISSA_BITCOUNT − 1 ) ) − 1 ) )
    {
      exponent++;
    }
    // compute mantissa and exponent for input number with rounding offset (quantize)
    int numberWithOffset = number + ( ( 1 << ( exponent − 1 ) ) >> 1 );
    exponent = 1;
    while ( numberWithOffset < −( 1 << ( exponent + MV_MANTISSA_BITCOUNT − 1 ) )
| |
        numberWithOffset > ( ( 1 << ( exponent + MV_MANTISSA_BITCOUNT − 1 ) )
− 1 ) )
    {
      exponent++;
    }
    mantissa = ( numberWithOffset >> ( exponent − 1 ) ) ^ MV_MANTISSA_LIMIT;
  }
  else
  {
    mantissa = number;
  }
  int mantissaExponentForm = exponent | ( mantissa << MV_EXPONENT_BITCOUNT );
  return mantissaExponentForm;}
```

Where, static const int MV_EXPONENT_BITCOUNT=4;

static const int MV_MANTISSA_BITCOUNT=6;

static const int MV_MANTISSA_LOWER_
        LIMIT=−(1<<(MV_MANTISSA_BITCOUNT−1));

static const int MV_MANTISSA_UPPER_LIMIT=
        ((1<<(MV_MANTISSA_BITCOUNT−1))−1);

static const int MV_MANTISSA_LIMIT=(1<<
        (MV_MANTISSA_BITCOUNT−1)); and static const int MV_EXPONENT_MASK=
        ((1<<MV_EXPONENT_BITCOUNT)−1);

Further, in one example of a Mantissa-Exponent representation computation, computing of mantissa and exponent for input number with rounding offset (quantize) may be as follows:

int numberWithOffset=number+(((1<<(exponent−
        1))−((number<0)?0:1))>>1);

Further, in one example of a Mantissa-Exponent representation computation, computing of mantissa and exponent for input number with rounding offset (quantize) may be as follows:

int numberWithOffset=number+(((1<<(exponent−
        1))−((number<0)?1:0))>>1);

Thus, in one example, according to the techniques herein, the derivation of collocated motion vectors may be as follows:

Invocation of Clause A, Storage Process for Temporal Luma Motion Information:

Clause A shall be invoked as part of the decoding process for current picture. Clause A shall be invoked after all motion information (motion vectors, reference indices, prediction utilization flags, flagging of long term reference picture) for the current picture has been decoded and its value determined. Clause A (and clauses invoked within clause A) shall be the last clause accessing the motion information in the decoding process of the current picture.

The function LongTermRefPic(aPic, aCb, refIdx, LX), with X being 0 or 1, is defined as follows:

If the picture with index refIdx from reference picture list LX of the slice containing coding block aCb in the picture aPic was marked as "used for long term reference" at the time when aPic was the current picture, LongTermRefPic(aPic, aCb, refIdx, LX) is equal to 1.

Otherwise, LongTermRefPic(aPic, aCb, refIdx, LX) is equal to 0.

Clause A. Storage Process for Temporal Luma Motion Information

Inputs to this process are:

Arrays of Prediction List Utilization Flags PredFlagL0 and PredFlagL1

Arrays of luma motion vectors MvL0 and MvL1

Arrays of reference indices RefIdxL0 and RefIdxL1

Outputs of this process are:
  Arrays MvL0Mantissa, MvL0Exponent, MvL1Mantissa and MvL1MExponent of luma motion vectors stored in mantissa and exponent representation
  Arrays LtrpFlagL0 and LtrpFlagL1 of flags indicating use of Long Term Reference Pictures
  The variable currPic specifies the current picture
  The following applies for xL from 0 to (pic_width_in_luma_samples >>3)
  The following applies for yL from 0 to (pic_height_in_luma_samples >>3):
    The variables x and y are assigned values (xL<<3) and (yL<<3) respectively
    The variable currCb specifies the coding block at luma location (x, y)
    When PredFlagL0[x][y] is equal to 0, assign −32 to MvL0Mantissa[x][y][0] and MvL0Mantissa[x][y][1], and 15 to MvL0Exponent[x][y][0] and MvL0Exponent[x][y][1], Otherwise the derivation process to scale and convert motion vector displacement to mantissa and exponent representation as specified in clause B is invoked with MvL0[x][y] as input, and the output is assigned to MvL0Mantissa[x][y] and MvL0Exponent[x][y]
    Assign output of LongTermRefPic(currPic, currCb, RefIdxL0[x][y], L0) to LtrpFlagL0[x][y]
    When PredFlagL1[x][y] is equal to 0, assign −32 to MvL1Mantissa[x][y][0] and MvL1Mantissa[x][y][1], and 15 to MvL1Exponent[x][y][0] and MvL1Exponent[x][y][1] Otherwise the derivation process to scale convert motion vector displacement to mantissa and exponent representation as specified in clause B is invoked with MvL1[x][y] as input, and the output is assigned to MvL1Mantissa[x][y] and MvL1Exponent[x][y]
    Assign output of LongTermRefPic(currPic, currCb, RefIdxL1[x][y], L1) to LtrpFlagL1[x][y]

Derivation Process for Collocated Motion Vectors
Inputs to this process are:
  a variable currCb specifying the current coding block,
  a variable colCb specifying the collocated coding block inside the collocated picture specified by ColPic,
  a luma location (xColCb, yColCb) specifying the top-left sample of the collocated luma coding block specified by colCb relative to the top-left luma sample of the collocated picture specified by ColPic,
  a reference index refIdxLX, with X being 0 or 1,
  a flag indicating a subblock temporal merging candidate sbFlag.
Outputs of this process are:
  the motion vector prediction mvLXCol in 1/16 fractional-sample accuracy,
  the availability flag availableFlagLXCol.
The variable currPic specifies the current picture.
The array mvL0MantissaCol[x][y], mvL0ExponentCol[x][y], ltrpL0FlagCol[x][y], mvL1MantissaCol[x][y], mvL1ExponentCol[x][y] and ltrpL1FlagCol[x][y] are set equal to MvL0Mantissa[x][y], MvL0Exponent[x][y] LtrpL0Flag[x][y], MvL1Mantissa[x][y] MvL1Exponent[x][y], and LtrpL1Flag[x][y] respectively of the collocated picture specified by ColPic.
When mvL0MantissaCol[x][y][0], mvL0ExponentCol[x][y][0], is equal to −32 and 15 respectively, set predFlagL0Col[x][y] equal to 0, Otherwise set predFlagL0Col[x][y] equal to 1.
When mvL1MantissaCol[x][y][0], mvL1ExponentCol[x][y][0] is equal to −32 and 15 respectively. set predFlagL1Col[x][y] equal to 0, Otherwise set predFlagL1Col[x][y] equal to 1.
The variables mvLXCol and availableFlagLXCol are derived as follows:
  If colCb is coded in an intra prediction mode, both components of mvLXCol are set equal to 0 and availableFlagLXCol is set equal to 0.
  Otherwise, the motion vector mvCol, the reference index refIdxCol and the reference list identifier listCol are derived as follows:
    If sbFlag is equal to 0, availableFlagLXCol is set to 1 and the following applies:
      If predFlagL0Col[xColCb][yColCb] is equal to 0, mvCol, and listCol are set equal to mvL1Col[xColCb][yColCb], and L1, respectively.
      Otherwise, if predFlagL0Col[xColCb][yColCb] is equal to 1 and predFlagL1Col[xColCb][yColCb] is equal to 0, mvCol, and listCol are set equal to mvL0Col[xColCb][yColCb], and L0, respectively.
      Otherwise (predFlagL0Col[xColCb][yColCb] is equal to 1 and predFlagL1Col[xColCb][yColCb] is equal to 1), the following assignments are made:
        If NoBackwardPredFlag is equal to 1, mvCol, and listCol are set equal to mvLXCol[xColCb][yColCb], and LX, respectively.
        Otherwise, mvCol, and listCol are set equal to mvLNCol[xColCb][yColCb], and LN, respectively, with N being the value of collocated_from_l0_flag.
    Otherwise (sbFlag is equal to 1), the following applies:
      If PredFlagLXCol[xColCb][yColCb] is equal to 1, mvCol, and listCol are set equal to mvLXCol[xColCb][yColCb], and LX, respectively, availableFlagLXCol is set to 1.
      Otherwise (PredFlagLXCol[xColCb][yColCb] is equal to 0), the following applies:
        If DiffPicOrderCnt(aPic, currPic) is less than or equal to 0 for every picture aPic in every reference picture list of the current slice and PredFlagLYCol[xColCb][yColCb] is equal to 1, mvCol, and listCol are set to mvLYCol[xColCb][yColCb], and LY, respectively, with Y being equal to !X where X being the value of X this process is invoked for. availableFlagLXCol is set to 1.
        Both the components of mvLXCol are set to 0 and availableFlagLXCol is set equal to 0.
  When availableFlagLXCol is equal to TRUE, mvLXCol and availableFlagLXCol are derived as follows:
    If LongTermRefPic(currPic, currCb, refIdxLX, LX) is not equal to ltrpLXFlagCol[xColCb][yColCb], both components of mvLXCol are set equal to 0 and availableFlagLXCol is set equal to 0.
    Otherwise, the variable availableFlagLXCol is set equal to 1, refPicListCol[refIdxCol] is set to be the picture with reference index refIdxCol in the reference picture list listCol of the slice containing coding block colCb in the collocated picture specified by ColPic, and the following applies:

colPocDiff=DiffPicOrderCnt(ColPic,refPicListCol
  [refIdxCol])

currPocDiff=DiffPicOrderCnt(currPic,RefPicListX
  [refIdxLX])

The derivation process for motion vector displacement from mantissa and exponent representation as specified in clause C is invoked with mvL0MantissaCol[xColCb][yColCb], mvL0ExponentCol[xColCb][yColCb] as input, and the output is assigned to mvColScaledQ.
If RefPicListX[refIdxLX] is a long-term reference picture, or colPocDiff is equal to currPocDiff, mvLXCol is derived as follows:

mvLXCol=mvColScaledQ

Otherwise, mvLXCol is derived as a scaled version of the motion vector mvColScaledQ as follows:

$tx$=4096 distScaleFactor=Clip3(−4096,4095,($tb*tx$+32)>>6)

mvLXCol=Clip3(−32768,32767,Sign (distScaleFactor*mvColScaledQ)*((Abs (distScaleFactor*mvColScaledQ)+127)>>8))

where td is derived as follows:
$tb$=Clip3(−128,127,currPocDiff)

Clause B. Derivation Process to Scale and Convert Motion Vector Displacement to Mantissa and Exponent Representation
Inputs to this process are:
  a array mvCol specifying the input motion vector,
Outputs of this process are:
  Arrays mvColScaledMantissa, mvColScaledExponent specifying the mantissa and exponent representation of the scaled temporal motion vector
The variable mvColScaled is derived as follows:

$tx$Scaled=(16384+(Abs($td$Scaled)>>1))/$td$Scaled distColScaleFactor=(4*$tx$Scaled+32)>>6 mvColScaled=Clip3(−32768,32767,Sign (distColScaleFactor*mvCol)*((Abs (distColScaleFactor*mvCol)+127)>>8))

where tdScaled is derived as follows:
$td$Scaled=Clip3(−128,127,colPocDiff)

The array mvColScaledMantissa, mvColScaledExponent is derived as follows:

```
for( dir = 0; dir < 2; dir++ ) {
  mantissa[ dir ] = mvColScaled[ dir ]
  exponent[ dir ] = 0
  if ( mvColScaled[ dir ] < −32 || mvColScaled[ dir ] > 31 ) {
    exponentOffset = 1
    while ( mvColScaled[ dir ] < −( 1 << ( exponentOffset[ dir ] + 5 ) ) ||
        mvColScaled[ dir ] > ( ( 1 << ( exponentOffset [ dir ] + 5 ) ) − 1 ) ) {
      exponentOffset++
    }
    offset = ( 1 << ( exponentOffset − 1 ) ) >> 1
    exponent[ dir ] = 1
    while ( ( mvColScaled[ dir ] + offset ) < −( 1 << ( exponent[ dir ] + 5 ) ) ||
        ( mvColScaled[ dir ] + offset ) > ( ( 1 << ( exponent[ dir ] + 5 ) ) −
1 ) ) {
      exponent[ dir ]++
      offset = ( 1 << ( exponent[ dir ] + 4 ) )
    }
    mantissa[ dir ] = ( ( mvColScaled[ dir ] + offset ) >> ( exponent[ dir ] − 1 ) ) ˆ 32
  }
  mvColScaledMantissa[dir] = mantissa[ dir ]
  mvColScaledExponent[dir] = exponent[ dir ]
}
```

Alternatively, in one example, the array mvColScaledMantissa, mvColScaledExponent may be derived as follows:

```
for( dir = 0; dir < 2; dir++ ) {
  mantissa[ dir ] = mvColScaled[ dir ]
  exponent[ dir ] = 0
  if ( mvColScaled[ dir ] < −32 || mvColScaled[ dir ] > 31 ) {
    exponentOffset = 1
    while ( mvColScaled[ dir ] < −( 1 << ( exponentOffset + 5 ) ) ||
        mvColScaled[ dir ] > ( ( 1 << ( exponentOffset + 5 ) ) − 1 ) ) {
      exponentOffset++
    }
    offset = ( ( 1 << ( exponentOffset − 1 ) ) − ( ( mvColScaled[ dir ] < 0 ) ? 0 : 1 ) ) >> 1
exponent[ dir ] = 1
    while ( ( mvColScaled[ dir ] + offset ) < −( 1 << ( exponent[ dir ] + 5 ) ) ||
        ( mvColScaled[ dir ] + offset ) > ( ( 1 << ( exponent[ dir ] + 5 ) ) − 1 ) ) {
      exponent[ dir ]++
      offset = ( 1 << ( exponent[ dir ] + 4 ) )
    }
    mantissa[ dir ] = ( ( mvColScaled[ dir ] + offset ) >> ( exponent[ dir ] − 1 ) ) ˆ 32
  }
  mvColScaledMantissa[dir] = mantissa[ dir ]
  mvColScaledExponent[dir] = exponent[ dir ]
}
```

Alternatively, in one example, the array mvColScaledMantissa, mvColScaledExponent may be derived as follows:

```
for( dir = 0; dir < 2; dir++ ) {
  mantissa[ dir ] = mvColScaled[ dir ]
  exponent[ dir ] = 0
  if ( mvColScaled[ dir ] < -32 || mvColScaled[ dir ] > 31 ) {
    exponentOffset = 1
    while ( mvColScaled[ dir ] < -( 1 << ( exponentOffset + 5 ) ) ||
        mvColScaled[ dir ] > ( ( 1 << ( exponentOffset + 5 ) ) - 1 ) ) {
      exponentOffset++
    }
    offset = offset = ( ( 1 << ( exponentOffset - 1 ) ) - ( ( mvColScaled[ dir ] < 0 ) ? 1 : 0 ) ) >> 1
  exponent[ dir ] = 1
    while ( ( mvColScaled[ dir ] + offset ) < -( 1 << ( exponent[ dir ] + 5 ) ) ||
        ( mvColScaled[ dir ] + offset ) > ( ( 1 << ( exponent[ dir ] + 5 ) ) - 1 ) ) {
      exponent[ dir ]++
      offset = ( 1 << ( exponent[ dir ] + 4 ) )
    }
    mantissa[ dir ] = ( ( mvColScaled[ dir ] + offset ) >> ( exponent[ dir ] - 1 ) ) ^ 32
  }
  mvColScaledMantissa[dir] = mantissa[ dir ]
  mvColScaledExponent[dir] = exponent[ dir ]
}
```

Clause C. Derivation Process for Motion Vector Displacement from Mantissa and Exponent Representation
Inputs to this process are:
  Arrays mvColScaledMantissa, mvColScaledExponent specifying the scaled temporal motion vector in mantissa and exponent representation,
Outputs of this process are:
  a array mvColScaledQ specifying the scaled temporal motion vector derived from its mantissa and exponent representation
The array mvColScaledQ is derived as follows:

```
for( dir = 0; dir < 2; dir++ ) {
  exponent[ dir ] = mvColScaledExponent[ dir ]
  mantissa[ dir ] = mvColScaledMantissa[ dir ]
  if ( exponent[ dir ] = = 0 )
    mvColScaledQ[ dir ] = mantissa[ dir ]
  else
    mvColScaledQ[ dir ] = ( ( mantissa[ dir ] ^ 32 ) << ( exponent[ dir ] - 1 ) )
}
``` where,
dir represents the displacement direction e.g. 0 represents horizontal and 1 represents vertical
In one example, according to the techniques herein, the clipping range for motion vector value is modified to 18-bits. In one example, Clip3(-32768, 32767, . . . ) is modified to Clip3(-131072, 131071, . . . ).

In one example, the conversion from mantissa-exponent representation to a derived integer number may be based on whether the exponent is a pre-determined number. For example, when exponent is equal to 0 the derived integer number is equal to the mantissa.

In one example, according to the techniques herein, the conversion from mantissa-exponent representation to an integer number may introduce a bias. It may be because mantissa-exponent representation is not fully symmetric (for example, when the mantissa is a 6-bit signed integer). It may be desirable not to have a sign-based bias. In one example, to avoid the sign bias, the mantissa may comprise a 5-bit unsigned integer and a 1-bit sign. For nonzero exponents, reconstruction would be (MV_MANTISSA_LIMIT+mantissa)*(1−2*sign)<<(exponent−1) instead of (mantissa^MV_MANTISSA_LIMIT)<<(exponent−1). Alternatively reconstruction from a 6-bit signed mantissa could be as follows if symmetric is desired: ((mantissa^MV_MANTISSA_LIMIT)+(mantissa<0?1:0))<<(exponent−1). In an example, MV_MANTISSA_LIMIT may be 32.

In one example, according to the techniques herein, the mantissa should be first sign extended before applying the XOR operation. For example, a 6-bit signed mantissa should first be sign extended to an 18-bit signed value before applying the XOR operation.

In one example, according to the techniques herein, the XOR operation between mantissa and a number is replaced by mantissa plus the number for positive (i.e., greater than or equal to 0) values of mantissa and mantissa minus the number for negative values of mantissa.

In one example, according to the techniques herein, the derivation of collocated motion vectors may be as follows:
Invocation of Clause A, Storage Process for Temporal Luma Motion Information:
Clause A shall be invoked as part of the decoding process for current picture. Clause A shall be invoked after all motion information (motion vectors, reference indices, prediction utilization flags, flagging of long term reference picture) for the current picture has been decoded and its value determined. Clause A (and clauses invoked within clause A) shall be the last clause accessing the motion information in the decoding process of the current picture.
Clause A. Storage Process for Temporal Luma Motion Information
Inputs to this process are:
  Arrays of Prediction List Utilization Flags PredFlagL0 and PredFlagL1
  Arrays of luma motion vectors MvL0 and MvL1
  Arrays of reference indices RefIdxL0 and RefIdxL1
Outputs of this process are:
  Arrays MvL0Mantissa, MvL0Exponent, MvL1Mantissa and MvL1MExponent of luma motion vectors stored in mantissa and exponent representation
The variable currPic specifies the current picture
The following applies for xL from 0 to (pic_width_in_luma_samples >>3):
  The following applies for yL from 0 to (pic_height_in_luma_samples >>3):
    The variables x and y are assigned values (xL<<3) and (yL<<3) respectively The variable currCb specifies the coding block at luma location (x, y)

The derivation process to convert motion vector displacement to mantissa and exponent representation as specified in clause B is invoked with MvL0[x][y] as input, and the output is assigned to MvL0Mantissa[x][y] and MvL0Exponent[x][y]

The derivation process to convert motion vector displacement to mantissa and exponent representation as specified in clause B is invoked with MvL1[x][y] as input, and the output is assigned to MvL1Mantissa[x][y] and MvL1Exponent[x][y]

Derivation Process for Collocated Motion Vectors

Inputs to this process are:
  a variable currCb specifying the current coding block,
  a variable colCb specifying the collocated coding block inside the collocated picture specified by ColPic,
  a luma location (xColCb, yColCb) specifying the top-left sample of the collocated luma coding block specified by colCb relative to the top-left luma sample of the collocated picture specified by ColPic,
  a reference index refIdxLX, with X being 0 or 1,
  a flag indicating a subblock temporal merging candidate sbFlag.

Outputs of this process are:
  the motion vector prediction mvLXCol in 1/16 fractional-sample accuracy,
  the availability flag availableFlagLXCol.

The variable currPic specifies the current picture.

The arrays predFlagL0Col[x][y], and refIdxL0Col[x][y] are set equal to PredFlagL0[x][y], and RefIdxL0[x][y], respectively, of the collocated picture specified by ColPic, and the arrays predFlagL1Col[x][y], and refIdxL1Col[x][y] are set equal to PredFlagL1[x][y], and RefIdxL1[x][y], respectively, of the collocated picture specified by ColPic.

The arrays mvL0MantissaCol[x][y], mvL0ExponentCol[x][y], mvL1MantissaCol[x][y] and mvL1ExponentCol[x][y] are set equal to MvL0Mantissa[x][y], MvL0Exponent [x][y], MvL1Mantissa[x][y] and MvL1Exponent[x][y] respectively of the collocated picture specified by ColPic.

The variables mvLXCol and availableFlagLXCol are derived as follows:
  If colCb is coded in an intra prediction mode, both components of mvLXCol are set equal to 0 and availableFlagLXCol is set equal to 0.
  Otherwise, the motion vector mvCol, the reference index refIdxCol and the reference list identifier listCol are derived as follows:
    If sbFlag is equal to 0, availableFlagLXCol is set to 1 and the following applies:
      If predFlagL0Col[xColCb][yColCb] is equal to 0, mvCol, refIdxCol and listCol are set equal to mvL1Col[xColCb][yColCb], refIdxL1Col[xColCb][yColCb]—and L1, respectively.
      Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb] refIdxL0Col[xColCb][yColCb] and L0, respectively.
      Otherwise (predFlagL0Col[xColCb][yColCb] is equal to 1 and predFlagL1Col[xColCb][yColCb] is equal to 1), the following assignments are made:
        If NoBackwardPredFlag is equal to 1, mvCol, refIdxCol and listCol are set equal to mvLXCol[xColCb][yColCb], refIdxLXCol[xColCb][yColCb] and LX, respectively.
        Otherwise, mvCol, refIdxCol and listCol are set equal to mvLNCol[xColCb][yColCb], refIdxLNCol[xColCb][yColCb] and LN, respectively, with N being the value of collocated_from_l0_flag.
    Otherwise (sbFlag is equal to 1), the following applies:
      If PredFlagLXCol[xColCb][yColCb] is equal to 1, mvCol, refIdxCol, and listCol are set equal to mvLXCol[xColCb][yColCb] refIdxLXCol[xColCb][yColCb], and LX, respectively, availableFlagLXCol is set to 1.
      Otherwise (PredFlagLXCol[xColCb][yColCb] is equal to 0), the following applies:
        If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCb][yColCb] refIdxLYCol[xColCb][yColCb] and LY, respectively, with Y being equal to !X where X being the value of X this process is invoked for. availableFlagLXCol is set to 1.
        Both the components of mvLXCol are set to 0 and availableFlagLXCol is set equal to 0.
  When availableFlagLXCol is equal to TRUE, mvLXCol and availableFlagLXCol are derived as follows:
    If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.
    Otherwise, the variable availableFlagLXCol is set equal to 1, refPicListCol[refIdxCol] is set to be the picture with reference index refIdxCol in the reference picture list listCol of the slice containing coding block colCb in the collocated picture specified by ColPic, and the following applies:

colPocDiff=DiffPicOrderCnt(ColPic,refPicListCol
  [refIdxCol])

currPocDiff=DiffPicOrderCnt(currPic,RefPicListX
  [refIdxLX])

The derivation process for motion vector displacement from mantissa and exponent representation as specified in clause C is invoked with mvL0MantissaCol[xColCb][yColCb], mvL0ExponentCol[xColCb][yColCb] as input, and the output is assigned to mvColQ.
  If RefPicListX[refIdxLX] is a long-term reference picture, or colPocDiff is equal to currPocDiff, mvLXCol is derived as follows:

mvLXCol=mvColQ

Otherwise, mvLXCol is derived as a scaled version of the motion vector mvColQ as follows:

tx=(16384+(Abs(*td*)>>1))/*td* distScaleFactor=Clip3(−4096,4095,(*tb*\**tx*+32)>>6)

mvLXCol=Clip3(−32768,32767,Sign
  (distScaleFactor*mvColQ)*((Abs
  (distScaleFactor*mvColQ)+127)>>8))

where td and tb are derived as follows:

$td = \text{Clip3}(-128, 127, \text{colPocDiff})$ $tb = \text{Clip3}(-128, 127, \text{currPocDiff})$ Clause B. Derivation Process to Convert Motion Vector Displacement to Mantissa and Exponent Representation
Inputs to this process are:
  an array mvCol specifying the input motion vector,
Outputs of this process are:
  Arrays mvColMantissa, mvColExponent specifying the mantissa and exponent representation of the temporal motion vector
    The array mvColMantissa, mvColExponent is derived as follows:

```
for( dir = 0; dir < 2; dir++ ) {
  mantissa[ dir ] = mvCol [ dir ]
  exponent[ dir ] = 0
  if ( mvCol[ dir ] < -32 | | mvCol[ dir ] > 31 ) {
    exponentOffset = 1
    while ( mvCol[ dir ] < -( 1 << ( exponentOffset + 5 ) ) | |
        mvCol[ dir ] > ( ( 1 << ( exponentOffset + 5 ) ) - 1 ) ) {
      exponentOffset++
    }
    offset = ( 1 << ( exponentOffset - 1 ) ) >> 1
    exponent[ dir ] = 1
    while ( ( mvCol[ dir ] + offset ) < -( 1 << ( exponent[ dir ] + 5 ) ) | |
        ( mvCol[ dir ] + offset ) > ( ( 1 << ( exponent[ dir ] + 5 ) ) - 1 ) ) {
      exponent[ dir ]++
    }
    mantissa[ dir ] = ( ( mvCol [ dir ] + offset ) >> ( exponent[ dir ] - 1 ) ) ^ 32
  }
  mvColMantissa[dir] = mantissa[ dir ]
  mvColExponent[dir] = exponent[ dir ]
}
```

Clause C. Derivation Process for Motion Vector Displacement from Mantissa and Exponent Representation
Inputs to this process are:
  Arrays mvColMantissa, mvColExponent specifying the temporal motion vector in mantissa and exponent representation,
Outputs of this process are:
  an array myColQ specifying the temporal motion vector derived from its mantissa and exponent representation
The array mvColQ is derived as follows:

```
for( dir = 0; dir < 2; dir++ ) {
  exponent[ dir ] = mvColExponent[ dir ]
  mantissa[ dir ] = mvColMantissa[ dir ]
  if ( exponent[ dir ] = = 0 )
    mvColQ[ dir ] = mantissa[ dir ]
  else
    mvColQ[ dir ] = ( ( mantissa[ dir ] ^ 32 ) << ( exponent[ dir ] - 1 ) )
}
```

In one example, scaling of motion vector is skipped, in which case mvColScaled is equal to mvCol in Clause B.
In one example, according to the techniques herein, the derivation of collocated motion vectors may be as follows:
Inputs to this process are:
  a variable currCb specifying the current coding block,
  a variable colCb specifying the collocated coding block inside the collocated picture specified by ColPic,
  a luma location (xColCb, yColCb) specifying the top-left sample of the collocated luma coding block specified by colCb relative to the top-left luma sample of the collocated picture specified by ColPic,
  a reference index refIdxLX, with X being 0 or 1,
  a flag indicating a subblock temporal merging candidate sbFlag.
Outputs of this process are:
  the motion vector prediction mvLXCol in 1/16 fractional-sample accuracy,
  the availability flag availableFlagLXCol.
The variable currPic specifies the current picture.
The arrays predFlagL0Col[x][y], mvLXCol[x][y] and refIdxL0Col[x][y] are set equal to PredFlagL0[x][y] MvL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvL1[x][y] and RefIdxL1[x][y], respectively, of the collocated picture specified by ColPic.

The variables mvLXCol and availableFlagLXCol are derived as follows:
  If colCb is coded in an intra prediction mode, or its reference picture is ColPic, both components of mvLXCol are set equal to 0 and availableFlagLXCol is set equal to 0.
  Otherwise, the motion vector mvCol, the reference index refIdxCol and the reference list identifier listCol are derived as follows:
    If sbFlag is equal to 0, availableFlagLXCol is set to 1 and the following applies:
      If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.
      Otherwise, if predFlagL0Col[xColCb][yColCb] is equal to 1 and predFlagL1Col[xColCb] [yColCb] is equal to 0, mvCol, refIdxCol and listCol are set equal to mvL0Col[xColCb][yColCb], refIdxL0Col[xColCb][yColCb] and L0, respectively.
      Otherwise (predFlagL0Col[xColCb][yColCb] is equal to 1 and predFlagL1Col[xColCb] [yColCb] is equal to 1), the following assignments are made:
        If NoBackwardPredFlag is equal to 1, mvCol, refIdxCol and listCol are set equal to mvLXCol[xColCb][yColCb], refIdxLXCol[xColCb][yColCb] and LX, respectively.
        Otherwise, mvCol, refIdxCol and listCol are set equal to mvLNCol[xColCb][yColCb], refIdxLNCol[xColCb][yColCb] and LN, respectively, with N being the value of collocated_from_l0_flag.

Otherwise (sbFlag is equal to 1), the following applies:

If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.

Otherwise (PredFlagLXCol[xColCb][yColCb] is equal to 0), the following applies:

If DiffPicOrderCnt(aPic, currPic) is less than or equal to 0 for every picture aPic in every reference picture list of the current tile group and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set to 1.

Both the components of mvLXCol are set to 0 and availableFlagLXCol is set equal to 0.

When availableFlagLXCol is equal to TRUE, mvLXCol and availableFlagLXCol are derived as follows:

If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the tile group containing coding block colCb in the collocated picture specified by ColPic, and the following applies:

colPocDiff=DiffPicOrderCnt(ColPic,refPicListCol[refIdxCol])

currPocDiff=DiffPicOrderCnt(currPic,RefPicListX[refIdxLX])

The temporal motion buffer compression process for collocated motion vectors as specified below is invoked with mvCol as input, and the output is assigned to mvCol.

If RefPicListX[refIdxLX] is a long-term reference picture, or colPocDiff is equal to currPocDiff, mvLXCol is derived as follows:

mvLXCol=mvCol

Otherwise, mvLXCol is derived as a scaled version of the motion vector mvCol as follows:

tx=(16384+(Abs(td)>>1))/td distScaleFactor=Clip3(−4096,4095,(tb*tx+32)>>6)

mvLXCol=Clip3(−32768,32767,Sign(distScaleFactor*mvCol)*((Abs(distScaleFactor*mvCol)+127)>>8))

where td and tb are derived as follows:

td=Clip3(−128,127,colPocDiff)

tb=Clip3(−128,127,currPocDiff)

Temporal Motion Buffer Compression Process for Collocated Motion Vectors

Input to this process is:
A motion vector mv,

Outputs of this process is:
A rounded motion vector rmv

For each motion vector component compIdx, rmv[compIdx] is derived from mv[compIdx] as follows:

$s$=mv[compIdx]>>17

$f$=Floor(Log 2((mv[compIdx]^$s$)|31))−4 mask=(−1<<$f$)>>1 round=(1<<$f$)>>2 rmv[compIdx]=(mv[compIdx]+round)&mask

It should be noted that this process enables storage of collocated motion vectors using a bit reduced representation. Each signed 18-bit motion vector component can be represented in a mantissa plus exponent format with a 6-bit signed mantissa and a 4-bit exponent.

In another example, the temporal motion buffer compression process for collocated motion vectors has the property of symmetry around 0. That is, if −mv[compIdx] is input instead of mv[compIdx], then the output is −rmv[compIdx] instead of rmv[compIdx]. As such, the Temporal motion buffer compression process for collocated motion vectors may be as follows:

Temporal Motion Buffer Compression Process for Collocated Motion Vectors

Input to this process is:
A motion vector mv,

Outputs of this process is:
A rounded motion vector rmv

For each motion vector component compIdx, rmv[compIdx] is derived from mv[compIdx] as follows:

$s$=mv[compIdx]>>17

$f$=Floor(Log 2((mv[compIdx]^$s$)|31))−4 mask=(−1<<$f$)>>1 round=((1<<$f$)+$s$)>>2 rmv[compIdx]=(mv[compIdx]+round)&mask

In another example, the Temporal motion buffer compression process for collocated motion vectors may be as follows:

Input to this process is:
A motion vector mv,

Outputs of this process is:
A rounded motion vector rmv

For each motion vector component compIdx, rmv[compIdx] is derived from mv[compIdx] as follows:

$s$=mv[compIdx]>>17

$f$=Floor(Log 2((mv[compIdx]^$s$)|31))−4 mask=(−1<<$f$)>>1 round=((1<<−$f$)−$s$)>>2 rmv[compIdx]=(mv[compIdx]+round)&mask

In another example, the Temporal motion buffer compression process for collocated motion vectors may be as follows:
Input to this process is:
  A motion vector mv,
Outputs of this process is:
  A rounded motion vector rmv
For each motion vector component compIdx, rmv[compIdx] is derived from mv[compIdx] as follows:

$s$=mv[compIdx]>>17

$f$=Floor(Log 2((mv[compIdx]^$s$)|31))−4 mask=(−1<<$f$)>>1 round=((1<<$f$)+$s$)>>2 rmv[compIdx]=Clip3(−(1<<17),(1<<17)−1,(mv[compIdx]+round)&mask)

In another example, the Temporal motion buffer compression process for collocated motion vectors may be as follows:
Input to this process is:
  A motion vector mv,
Outputs of this process is:
  A rounded motion vector rmv
For each motion vector component compIdx, rmv[compIdx] is derived from mv[compIdx] as follows:

$s$=mv[compIdx]>>17

$f$=Floor(Log 2((mv[compIdx]^$s$)|31))−4 mask=(−1<<$f$)>>1 round=((1<<$f$)+$s$)>>2 rmv[compIdx]=Clip3(−(64<<11),(63<<11),(mv[compIdx]+round)&mask)

It should be noted that in the case above where rmv[compIdx]=Clip3(−(64<<11), (63<<11), (mv[compIdx]+round) & mask), the following set of operations:

$s$=mv[compIdx]>>17

$f$=Floor(Log 2((mv[compIdx]^$s$)|31))−4 mask=(−1<<$f$)>>1 round=((1<<$f$)+$s$)>>2 rmv[compIdx]=Clip3(−(64<<11),(63<<11),(mv[compIdx]+round)&mask)

is equivalent to:

cmv[compIdx]=Clip3(−(64<<11),(63<<11),mv[compIdx])

$s$=mv[compIdx]>>17

$f$=Floor(Log 2((cmv[compIdx]^$s$)|31))−4 mask=(−1<<$f$)>>1 round=((1<<$f$)+$s$)>>2 rmv[compIdx]=(cmv[compIdx]+round)&mask

As such, in the case where rmv[compIdx]=Clip3(−(64<<11), (63<<11), (mv[compIdx]+round)&mask), the clipping operation can be performed earlier in the derivation process, if desired, (e.g., in order to improve computational throughput).

Further, it should be noted that in one example, mvLXCol may be clipped in a derivation of collocated motion vectors process as follows:
  If RefPicListX[refIdxLX] is a long-term reference picture, or colPocDiff is equal to currPocDiff, mvLXCol is derived as follows:

mvLXCol=Clip3(−(1<<17),(1<<17)−1,mvCol)

Otherwise, mvLXCol is derived as a scaled version of the motion vector mvCol as follows:

$tx$=(16384+(Abs($td$)>>1))/$td$ distScaleFactor=Clip3(−4096,4095,($tb$*$tx$+32)>>6)

mvLXCol=Clip3(−(1<<17),(1<<17)−1,Sign(distScaleFactor*mvCol)*((Abs(distScaleFactor*mvCol)+127)>>8))

where td and tb are derived as follows:

$td$=Clip3(−128,127,colPocDiff)

$tb$=Clip3(−128,127,currPocDiff)

Referring again to FIG. 6, as illustrated in FIG. 6, inter prediction processing unit 214 may receive reconstructed video block via filter unit 216, which may be part of an in-loop filtering process. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data. Entropy encoding unit 218 receives quantized transform coefficients and predictive syntax data (i.e., intra prediction data, motion prediction data, QP data, etc.). Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. In this manner, video encoder 200 represents an example of a device configured to determine a full precision motion vector for generating a prediction for video block in a first picture, store the motion vector at less than the full precision, and generate a motion vector predictor candidate for a video block in a second picture from the stored motion vector.

Figure 7:
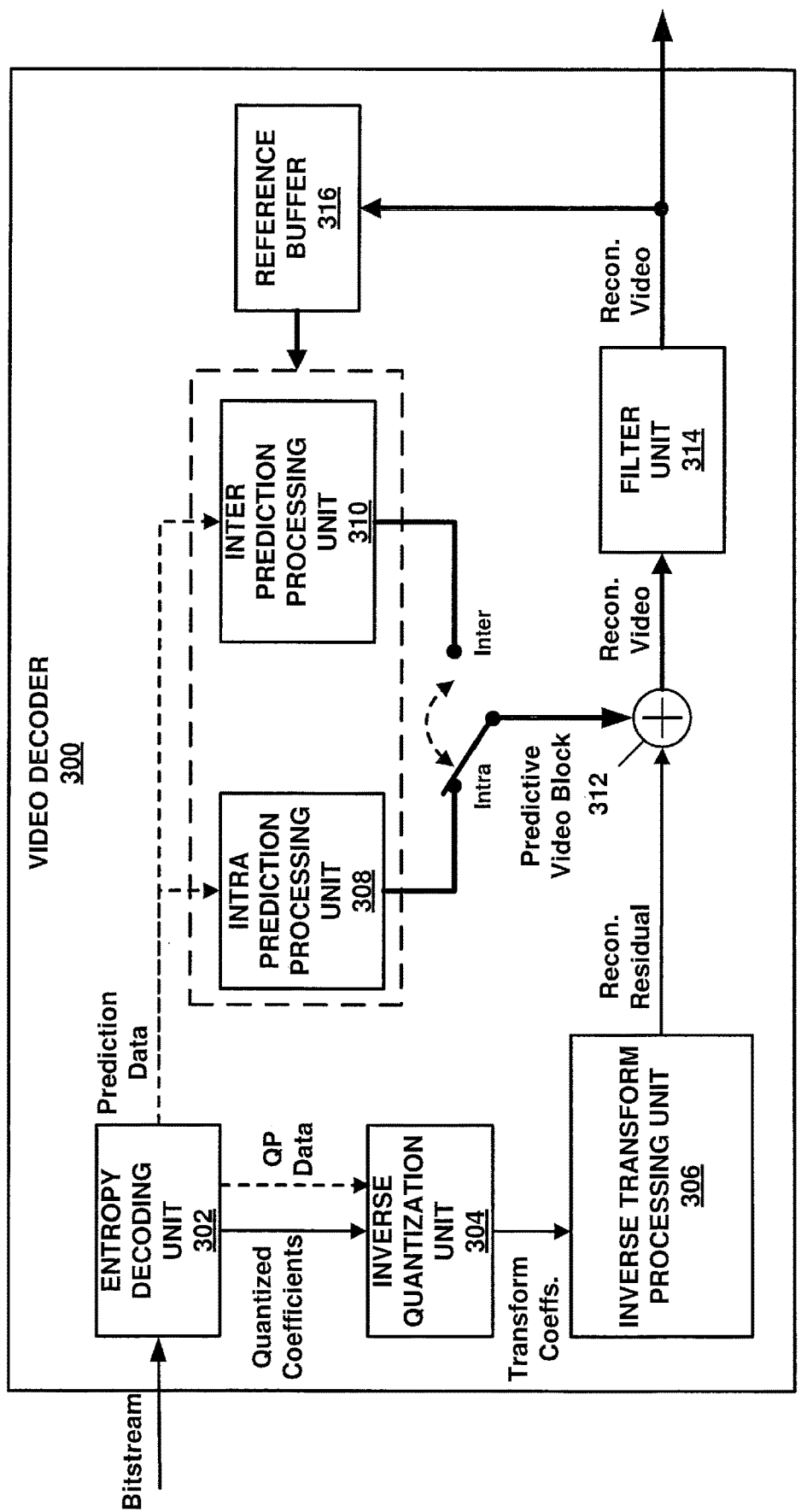
FIG. 7 is a block diagram illustrating an example of a video decoder that may be configured to decode video data according to one or more techniques of this disclosure.

FIG. 7 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 7 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or subcomponents thereof to a particular hardware or software architecture. Functions of video decoder 300 may be realized using any combination of hardware, firmware, and/or software implementations.

As illustrated in FIG. 7, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. Inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 7, reconstructed residual data may be provided to summer 312. Summer 312 may add reconstructed residual data to a predictive video block and generate reconstructed video data.

As describe above, a predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block.

As described above, video decoder 300 may parse an encoded bitstream where the encoded bitstream is generated based on the techniques described above and as described above, video encoder 200 may generate a bitstream according to the motion vector prediction techniques described above. Thus, video decoder 300 may be configured to perform motion vector prediction according to techniques described above. In this manner video decoder 300 represents an example of a device configured to determine a full precision motion vector for generating a prediction for video block in a first picture, store the motion vector at less than the full precision, and generate a motion vector predictor candidate for a video block in a second picture from the stored motion vector.

Referring again to FIG. 7, filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 7 a reconstructed video block may be output by video decoder 300.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on provisional Application No. 62/768,772 on Nov. 16, 2018, No. 62/787,695 on Jan. 2, 2019, No. 62/792,872 on Jan. 15, 2019, No. 62/793,080 on Jan. 16, 2019, No. 62/793,311 on Jan. 16, 2019, No. 62/815,109 on Mar. 7, 2019, the entire contents of which are hereby incorporated by reference.

The invention claimed is:

1. A method of performing motion vector prediction for coding video data, the method comprising:
   receiving a motion vector;
   deriving a mask information based on the motion vector;
   deriving a round information based on the motion vector;
   deriving a rounded motion vector by masking a value, obtained by adding the round information to the motion vector, based on the mask information; and
   generating a collocated motion vector based on the rounded motion vector.

2. The method of claim 1 further comprising deriving a number of bits based on the motion vector,
   wherein the mask information is derived based on the number of bits, and the rounded information is derived based on the number of bits.

3. The method of claim 2, wherein the mask information is used for masking (f−1) least significant bits of the value to 0, wherein the f is the number of bits.

* * * * *